US00RE46309E

(19) United States
(12) Reissued Patent
Go et al.

(10) Patent Number: US RE46,309 E
(45) Date of Reissued Patent: Feb. 14, 2017

(54) APPLICATION SHARING

(71) Applicant: Social Communications Company, Eugene, OR (US)

(72) Inventors: Alexander Say Go, Sammamish, WA (US); Vladimir Petter, Bellevue, WA (US)

(73) Assignee: Sococo, Inc., Eugene, OR (US)

(21) Appl. No.: 14/666,298

(22) Filed: Mar. 23, 2015

Related U.S. Patent Documents

Reissue of:
(64) Patent No.: 8,407,605
Issued: Mar. 26, 2013
Appl. No.: 12/418,270
Filed: Apr. 3, 2009

(51) Int. Cl.

| | |
|---|---|
| ***G06F 3/00*** | (2006.01) |
| ***G06F 3/048*** | (2013.01) |
| ***G06F 15/16*** | (2006.01) |
| ***G06F 3/0481*** | (2013.01) |
| ***G06F 3/14*** | (2006.01) |

(Continued)

(52) U.S. Cl.
CPC ..... *G06F 3/0481* (2013.01); *G06F 3/04815* (2013.01); *G06F 3/1454* (2013.01); *G06F 9/4443* (2013.01); *H04L 67/025* (2013.01); *H04L 67/38* (2013.01); *G06F 2209/545* (2013.01); *G09G 5/14* (2013.01); *H04L 12/1813* (2013.01)

(58) Field of Classification Search
CPC ..... H04L 67/025; G06F 3/048
USPC ..... 715/733, 788, 790, 751, 753, 757, 759, 715/765, 766; 709/204, 205
See application file for complete search history.

(56) References Cited

U.S. PATENT DOCUMENTS 5,471,318 A 11/1995 Ahuja
5,491,743 A 2/1996 Shiio et al.
(Continued)

FOREIGN PATENT DOCUMENTS

CN 1678994 A 10/2005
CN 1701568 11/2005
(Continued)

OTHER PUBLICATIONS

Search report and written opinion issued on Aug. 13, 2010, in counterpart PCT Application No. PCT/US2010/020596.
(Continued)

*Primary Examiner* — Dennis Bonshock
(74) *Attorney, Agent, or Firm* — Law Office of Edouard Garcia

(57) ABSTRACT

Ones of the windows associated with a software process are identified in a screen layout on a local display of a sharer network node. On the sharer network node, an image of the identified windows as they are arranged in the screen layout and free of obscuration by any other windows in the screen layout is generated. The image is transmitted from the sharer network node to a viewer network node. Also, commands derived from input device events on sharer and viewer network nodes are received. The received commands are processed into a command sequence, which is passed to a shared process executing on the sharer network node. Windows associated with the shared process are presented on the sharer network node in accordance with the received command sequence. An image of the presented windows is generated and transmitted from the sharer network node to the viewer network node.

40 Claims, 18 Drawing Sheets

(51) Int. Cl.

| | |
|---|---|
| ***G06F 9/44*** | (2006.01) |
| ***H04L 29/06*** | (2006.01) |
| ***H04L 29/08*** | (2006.01) |
| *H04L 12/18* | (2006.01) |
| *G09G 5/14* | (2006.01) |

(56) References Cited

U.S. PATENT DOCUMENTS 5,627,978 A 5/1997 Altom
5,727,155 A * 3/1998 Dawson ..... 709/205
5,737,533 A 4/1998 Hond
5,758,110 A 5/1998 Boss
5,764,916 A 6/1998 Busey
5,793,365 A 8/1998 Tang et al.
5,938,724 A 8/1999 Pommier
5,949,414 A * 9/1999 Namikata et al. ..... 715/753
5,956,038 A 9/1999 Rekimoto
5,982,372 A 11/1999 Brush, II et al.
5,995,096 A * 11/1999 Kitahara et al. ..... 715/753
5,999,206 A 12/1999 Inoue et al.
5,999,208 A * 12/1999 McNerney et al. ..... 348/14.08
6,005,578 A 12/1999 Cole
6,047,314 A * 4/2000 Pommier et al. ..... 709/205
6,057,856 A 5/2000 Miyashita et al.
6,119,147 A * 9/2000 Toomey et al. ..... 709/204
6,215,498 B1 4/2001 Filo
6,219,045 B1 4/2001 Leahy et al.
6,226,655 B1 5/2001 Borman et al.
6,304,283 B1 * 10/2001 Kitagawa ..... 348/14.06
6,308,199 B1 * 10/2001 Katsurabayashi ..... 709/204
6,335,927 B1 1/2002 Elliott et al.
6,342,906 B1 * 1/2002 Kumar et al. ..... 715/751
6,380,952 B1 4/2002 Mass et al.
6,392,760 B1 5/2002 Ahuja
6,396,509 B1 5/2002 Cheng
6,426,778 B1 7/2002 Valdez
6,473,096 B1 10/2002 Kobayashi et al.
6,480,191 B1 11/2002 Balabanovic
6,567,980 B1 5/2003 Jain et al.
6,570,587 B1 5/2003 Efrat et al.
6,572,476 B2 6/2003 Shoji et al.
6,580,441 B2 6/2003 Schileru-Key
6,704,784 B2 3/2004 Matsuda et al.
6,708,172 B1 3/2004 Wong et al.
6,714,222 B1 3/2004 Chincholle et al.
6,721,741 B1 4/2004 Eyal et al.
6,731,314 B1 5/2004 Cheng et al.
6,735,708 B2 5/2004 Busey
6,772,195 B1 8/2004 Hatlelid et al.
6,784,901 B1 8/2004 Harvey et al.
6,833,863 B1 12/2004 Clemens
6,862,625 B1 3/2005 Busey
6,909,443 B1 * 6/2005 Robertson et al. ..... 715/782
7,007,235 B1 * 2/2006 Hussein ..... G06Q 10/10 715/751
7,036,082 B1 4/2006 Dalrymple
7,058,896 B2 6/2006 Hughes
7,080,096 B1 7/2006 Imamura
7,086,005 B1 8/2006 Matsuda
7,145,898 B1 12/2006 Elliott
7,165,213 B1 1/2007 Busey
7,168,048 B1 * 1/2007 Goossen et al. ..... 715/797
7,181,690 B1 2/2007 Leahy et al.
7,184,037 B2 2/2007 Gallery et al.
7,188,317 B1 * 3/2007 Hazel ..... 715/804
7,240,093 B1 7/2007 Danieli et al.
7,260,784 B2 * 8/2007 Crichton ..... 715/751
7,263,526 B1 8/2007 Busey
7,293,243 B1 * 11/2007 Ben-Shachar et al. ..... G06F 3/1454 715/751
7,305,438 B2 12/2007 Christensen et al.
7,336,779 B2 2/2008 Boyer
7,356,563 B1 4/2008 Leichtling
7,415,502 B2 8/2008 Vishik et al.
7,418,664 B2 8/2008 Ben-Shachar
7,451,181 B2 11/2008 Sasaki
7,467,356 B2 12/2008 Gettman et al.
7,474,741 B2 1/2009 Brunson
7,503,006 B2 3/2009 Danieli
7,516,411 B2 4/2009 Grossner
7,533,346 B2 5/2009 McGrath et al.
7,616,624 B2 11/2009 John
7,640,300 B2 12/2009 Wohlgemuth et al.
7,680,098 B2 3/2010 John
7,680,480 B2 3/2010 John
7,680,885 B2 3/2010 Schauser
7,734,692 B1 6/2010 Kaplan et al.
7,765,259 B2 7/2010 MacVarish
7,769,806 B2 8/2010 Wie et al.
7,813,488 B2 10/2010 Kozdon
7,840,668 B1 11/2010 Sylvain
7,844,724 B2 11/2010 Wie et al.
7,908,663 B2 3/2011 Horvitz et al.
7,958,453 B1 6/2011 Taing
7,979,574 B2 7/2011 Gillo et al.
8,191,001 B2 5/2012 Wie et al.
8,578,044 B2 11/2013 Wie et al.
8,621,079 B2 12/2013 Wie et al.
8,930,472 B2 1/2015 Leacock et al.
2001/0023450 A1 9/2001 Chu
2001/0034740 A1 10/2001 Kerne
2002/0019833 A1 2/2002 Hanamoto
2002/0026388 A1 2/2002 Roebuck
2002/0033844 A1 3/2002 Levy et al.
2002/0033848 A1 3/2002 Sciammarella et al.
2002/0049814 A1 4/2002 Yoo
2002/0052918 A1 5/2002 Rekimoto et al.
2002/0080195 A1 6/2002 Carlson et al.
2002/0097267 A1 7/2002 Dinan et al.
2002/0112028 A1 8/2002 Colwill
2002/0116458 A1 8/2002 Bricklin et al.
2002/0165922 A1 * 11/2002 Wei ..... 709/205
2002/0169829 A1 11/2002 Shuster
2002/0178072 A1 11/2002 Gusler et al.
2002/0188959 A1 12/2002 Piotrowski
2003/0009469 A1 1/2003 Platt et al.
2003/0037110 A1 2/2003 Yamamoto
2003/0043200 A1 3/2003 Faieta et al.
2003/0065558 A1 4/2003 Shaw et al.
2003/0077561 A1 * 4/2003 Alsop et al. ..... 434/408
2003/0149731 A1 8/2003 Ohwa
2003/0158953 A1 8/2003 Lal
2003/0184579 A1 10/2003 Zhang et al.
2003/0189599 A1 * 10/2003 Ben-Shachar et al. ..... 345/790
2003/0192049 A1 10/2003 Schneider et al.
2003/0195928 A1 10/2003 Kamijo et al.
2003/0197739 A1 * 10/2003 Bauer ..... 345/800
2003/0215779 A1 11/2003 Dupont et al.
2004/0078444 A1 4/2004 Malik
2004/0128350 A1 * 7/2004 Topfl et al. ..... 709/204
2004/0179038 A1 9/2004 Blattner et al.
2004/0183827 A1 * 9/2004 Putterman et al. ..... 345/744
2004/0210847 A1 * 10/2004 Berson et al. ..... 715/788
2004/0268451 A1 12/2004 Robbin et al.
2005/0021624 A1 1/2005 Herf et al.
2005/0058094 A1 3/2005 Lazaridis et al.
2005/0075885 A1 4/2005 Danieli
2005/0080866 A1 4/2005 Kent
2005/0086612 A1 4/2005 Gettman et al.
2005/0088452 A1 * 4/2005 Hanggie et al. ..... 345/581
2005/0132299 A1 * 6/2005 Jones et al. ..... 715/759
2005/0138570 A1 6/2005 Good et al.
2005/0144247 A1 6/2005 Christensen et al.
2005/0154574 A1 7/2005 Takemura et al.
2005/0215252 A1 9/2005 Jung et al.
2005/0232168 A1 10/2005 Schauser
2005/0261980 A1 11/2005 Hadi
2006/0005187 A1 * 1/2006 Neil ..... 718/1
2006/0031779 A1 2/2006 Theurer
2006/0041684 A1 2/2006 Daniell et al.
2006/0117264 A1 6/2006 Beaton et al.
2006/0136837 A1 6/2006 Ben-Shachar
2006/0161624 A1 * 7/2006 Montgomery et al. ..... 709/204

(56) References Cited

U.S. PATENT DOCUMENTS

2006/0167996 A1* 7/2006 Orsolini et al. ..... 709/204
2006/0184886 A1 8/2006 Chung et al.
2006/0230156 A1* 10/2006 Shappir et al. ..... 709/227
2006/0248159 A1 11/2006 Polan
2006/0271877 A1* 11/2006 Theurer ..... G06F 9/4443 715/781
2006/0293103 A1 12/2006 Mendelsohn
2007/0011232 A1* 1/2007 Manion et al. ..... 709/204
2007/0047700 A1 3/2007 Mohler
2007/0061399 A1* 3/2007 Schmieder et al. ..... 709/204
2007/0070066 A1 3/2007 Bakhash
2007/0101282 A1 5/2007 Goossen
2007/0136686 A1 6/2007 Price
2007/0156908 A1 7/2007 Szomolanyi et al.
2007/0160129 A1 7/2007 Fujisawa et al.
2007/0162432 A1 7/2007 Armstrong
2007/0184855 A1 8/2007 Klassen et al.
2007/0192427 A1 8/2007 Berstis et al.
2007/0198726 A1 8/2007 Marco et al.
2007/0204047 A1* 8/2007 Parker et al. ..... 709/227
2007/0220568 A1 9/2007 Fukasawa
2007/0226357 A1 9/2007 McMurry et al.
2007/0233785 A1 10/2007 Abraham
2007/0234212 A1 10/2007 de Souza
2007/0279484 A1 12/2007 Derocher et al.
2007/0291034 A1 12/2007 Dones
2007/0291706 A1 12/2007 Miller et al.
2007/0299778 A1 12/2007 Haveson et al.
2008/0019285 A1 1/2008 John
2008/0021949 A1 1/2008 John
2008/0033941 A1 2/2008 Parrish
2008/0052373 A1 2/2008 Pousti
2008/0086696 A1 4/2008 Prakash et al.
2008/0091692 A1 4/2008 Keith et al.
2008/0098121 A1 4/2008 Wu
2008/0101561 A1 5/2008 Choi et al.
2008/0133580 A1 6/2008 Wanless et al.
2008/0163090 A1 7/2008 Cortright
2008/0168154 A1 7/2008 Skyrm et al.
2008/0209075 A1 8/2008 Shamma
2008/0221998 A1 9/2008 Mendelsohn et al.
2008/0244458 A1 10/2008 Brugiolo
2008/0250115 A1 10/2008 Iyer
2008/0252637 A1 10/2008 Berndt et al.
2008/0262910 A1 10/2008 Altberg et al.
2008/0262911 A1 10/2008 Altberg et al.
2008/0263460 A1 10/2008 Altberg et al.
2008/0301557 A1 12/2008 Kotlyar
2009/0018912 A1 1/2009 Altberg et al.
2009/0079816 A1 3/2009 Qvarfordt et al.
2009/0089364 A1 4/2009 Hamilton, II et al.
2009/0089685 A1 4/2009 Mordecai et al.
2009/0096810 A1* 4/2009 Green ..... 345/620
2009/0112997 A1 4/2009 Parker, II et al.
2009/0113066 A1 4/2009 Wie et al.
2009/0113314 A1 4/2009 Dawson et al.
2009/0128567 A1 5/2009 Shuster et al.
2009/0132943 A1 5/2009 Minsky et al.
2009/0193077 A1 7/2009 Horii et al.
2009/0199095 A1 8/2009 Nicol, II
2009/0222742 A1 9/2009 Pelton et al.
2009/0235180 A1* 9/2009 Liu et al. ..... 715/751
2009/0241037 A1 9/2009 Hyndman
2009/0247196 A1 10/2009 Kim et al.
2009/0251457 A1 10/2009 Walker et al.
2009/0254840 A1 10/2009 Churchill et al.
2009/0254843 A1 10/2009 Wie et al.
2009/0259948 A1 10/2009 Hamilton, II et al.
2009/0286605 A1 11/2009 Hamilton, II et al.
2009/0288007 A1 11/2009 Leacock et al.
2009/0300521 A1 12/2009 Jerrard-Dunne et al.
2009/0307620 A1 12/2009 Hamilton, II et al.
2010/0058202 A1 3/2010 Rostom
2010/0058229 A1* 3/2010 Mercer ..... 715/788
2010/0077034 A1 3/2010 Alkov et al.
2010/0131868 A1* 5/2010 Chawla ..... G06F 3/044 715/759
2010/0146085 A1 6/2010 Wie et al.
2010/0146118 A1 6/2010 Wie
2010/0162121 A1 6/2010 Yoakum
2010/0164956 A1 7/2010 Hyndman
2010/0169796 A1 7/2010 Lynk
2010/0169799 A1 7/2010 Hyndman
2010/0169801 A1 7/2010 Blattner et al.
2010/0169837 A1 7/2010 Hyndman
2010/0211880 A1 8/2010 Haggar et al.
2010/0221693 A1 9/2010 Gupta
2010/0228547 A1 9/2010 Scott et al.
2010/0228560 A1 9/2010 Balasaygun
2010/0235501 A1 9/2010 Klemm
2010/0241432 A1 9/2010 Michaelis
2010/0246570 A1 9/2010 Chavez
2010/0246571 A1 9/2010 Geppert
2010/0246800 A1 9/2010 Geppert
2010/0251119 A1 9/2010 Geppert
2010/0251124 A1 9/2010 Geppert
2010/0251127 A1 9/2010 Geppert
2010/0251142 A1 9/2010 Geppert
2010/0251158 A1 9/2010 Geppert
2010/0251177 A1 9/2010 Geppert
2010/0257450 A1 10/2010 Go et al.
2010/0262550 A1 10/2010 Burritt
2010/0274848 A1 10/2010 Altmaier et al.
2010/0287274 A1 11/2010 Martinez et al.
2010/0322395 A1 12/2010 Michaelis
2011/0029898 A1 2/2011 Malik
2011/0029907 A1 2/2011 Bakhash
2011/0106662 A1 5/2011 Stinchcomb
2011/0169927 A1 7/2011 Mages et al.
2011/0196930 A1 8/2011 Chawla et al.
2011/0231781 A1 9/2011 Betzler et al.
2011/0274104 A1 11/2011 Cozzi et al.
2011/0302509 A1 12/2011 Leacock et al.
2012/0066306 A1 3/2012 Leacock et al.
2012/0124486 A1* 5/2012 Robinson ..... G06F 17/30867 715/753
2012/0179672 A1 7/2012 Wie et al.
2012/0216131 A1 8/2012 Moyers et al.
2012/0246582 A1 9/2012 Leacock et al.
2012/0254858 A1 10/2012 Moyers et al.
2013/0073978 A1 3/2013 Butler et al.
2013/0109418 A1 5/2013 Lazaridis et al.
2014/0129644 A1* 5/2014 Mohan ..... H04L 65/403 709/205
2014/0213309 A1 7/2014 Lazaridis et al.

FOREIGN PATENT DOCUMENTS

CN 101499080 A 8/2009
EP 1964597 9/2008
EP 1964597 A1 9/2008
EP 2237537 10/2010
EP 2239930 10/2010
JP 2002123479 4/2002
JP 2002149580 5/2002
JP 2002224447 8/2002
JP 2003067317 3/2003
JP 2004272579 A 9/2004
JP 2005182331 A 7/2005
JP 2005286749 A 10/2005
JP 2007506309 A 3/2007
JP 2007184871 A 7/2007
JP 2007251380 A 9/2007
JP 2008182670 A 8/2008
JP 2010535363 A 11/2010
KR 1019990078775 A 11/1999
KR 1020000030491 A 6/2000
KR 1020010100589 A 11/2001
KR 1020030054874 A 7/2003
KR 1020040011825 A 2/2004
KR 1020060060788 A 6/2006
KR 1020070105088 10/2007
KR 1020090016692 A 2/2009
WO 2006127429 11/2006

(56) References Cited

FOREIGN PATENT DOCUMENTS

| | | | |
|---|---|---|---|
| WO | 2008008806 | | 1/2008 |
| WO | 2008106196 | A1 | 9/2008 |
| WO | 2009000028 | A1 | 12/2008 |

OTHER PUBLICATIONS

International Search Report and Written Opinion issued in counterpart International Application No. PCT/US2012/030766 (mailed Oct. 19, 2012).
01-Allowance Notice dated Oct. 9, 2012 in related U.S. Appl. No. 12/354,709, filed Jan. 15, 2009.
02-IDS dated Sep. 20, 2012 in related U.S. Appl. No. 12/354,709, filed Jan. 15, 2009.
03-RCE dated Sep. 20, 2012 in related U.S. Appl. No. 12/354,709, filed Jan. 15, 2009.
04-Allowance Notice dated Aug. 28, 2012 in related U.S. Appl. No. 12/354,709, filed Jan. 15, 2009.
05-Amendment dated Mar. 18, 2012 in related U.S. Appl. No. 12/354,709, filed Jan. 15, 2009.
06-Non-final Office Action dated Sep. 7, 2011 in related U.S. Appl. No. 12/354,709, filed Jan. 15, 2009.
07-Non-final Office action dated Dec. 27, 2011 in related U.S. Appl. No. 12/354,709, filed Jan. 15, 2009.
11-Final Office Action dated Sep. 10, 2012 in related U.S. Appl. No. 12/509,658, filed Jul. 27, 2009.
12-Amendment dated May 30, 2012 in related U.S. Appl. No. 12/509,658, filed Jul. 27, 2009.
13-Non-Final Office Action dated Mar. 1, 2012 in related U.S. Appl. No. 12/509,658, filed Jul. 27, 2009.
14-Pre-Appeal Brief Request for Review dated Nov. 10, 2015 in related U.S. Appl. No. 13/666,717, filed Nov. 1, 2012.
15-Advisory Action dated Oct. 16, 2015 in related U.S. Appl. No. 13/666,717, filed Nov. 1, 2012.
16-Response After Final dated Sep. 14, 2015 in related U.S. Appl. No. 13/666,717, filed Nov. 1, 2012.
17-Final Rejection dated Sep. 10, 2015 in related U.S. Appl. No. 13/666,717, filed Nov. 1, 2012.
18-Amendment dated Jul. 20, 2015 in related U.S. Appl. No. 13/666,717, filed Nov. 1, 2012.
19-Non-Final Office Action dated Apr. 22, 2015 in related U.S. Appl. No. 13/666,717, filed Nov. 1, 2012.
20-Notice of Allowance dated Jun. 20, 2016 in related U.S. Appl. No. 13/666,717, filed Nov. 1, 2012.
21-Appeal Brief dated Dec. 8, 2015 in related U.S. Appl. No. 13/666,717, filed Nov. 1, 2012.
22-Pre-Brief Appeal Conference Decision dated Nov. 27, 2015 in related U.S. Appl. No. 13/666,717, filed Nov. 1, 2012.
"Microsoft Computer Dictionary", Third Edition, 1997. Definitions for"audit," "auditing," and "audit trail" (p. 36), "log" (p. 288, "security log" (p. 426), "user account," and "user profile" (p. 488).*
International search report and written opinion received in counterpart International application No. PCTIUS2010/028088, mailed Oct. 27, 2010.

* cited by examiner

APPLICATION SHARING

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application *is an application for reissue of U.S. Pat. No. 8,407,605 and* relates to the following co-pending patent applications, the entirety of each of which is incorporated herein by reference:

U.S. patent application Ser. No. 12/354,709, filed Jan. 15, 2009;

U.S. patent application Ser. No. 61/120,372, filed Dec. 5, 2008;

U.S. patent application Ser. No. 61/042,714, filed Apr. 5, 2008;

U.S. patent application Ser. No. 11/923,629, filed Oct. 24, 2007; and

U.S. patent application Ser. No. 11/923,634, filed Oct. 24, 2007.

BACKGROUND OF THE INVENTION

When face-to-face communications are not practical, people often rely on one or more technological solutions to meet their communications needs. These solutions typically are designed to simulate one or more aspects of face-to-face communications. Traditional telephony systems enable voice communications between callers. Instant messaging (also referred to as "chat") communications systems enable users to communicate text messages in real time through instant message computer clients that are interconnected by an instant message server. Some instant messaging systems additionally allow users to be represented in a virtual environment by user-controllable graphic objects (referred to as "avatars"). Interactive virtual reality communication systems enable users in remote locations to communicate over multiple real-time channels and to interact with each other by manipulating their respective avatars in three-dimensional virtual spaces. Each of these modes of communications typically can handle some form of data sharing between the communicants.

A common form of data sharing is application sharing, which involves transmitting application data from one node (referred to as the "sharer node") to one or more other nodes (referred to as "viewer nodes"). Application sharing has a variety of useful applications, including providing remote technical support, remote collaboration, and remote presentation of demonstrations, documents, and images. In some proposed systems, an application sharing program on the sharer node periodically collects drawing commands (e.g., GDI calls for drawing lines and curves, rendering fonts and handling palettes) from a chained display driver process on the sharer node, packages the drawing commands into an order packet, and sends the order packet to a respective counterpart application sharing program on each of the viewer nodes that accurately constructs the shared view of the sharer's display. Such an application sharing approach, however, requires each viewer node to render its own version of the shared application by passing the drawing commands in the order packet to a display process (e.g., the GDI interface provided by a Microsoft® Windows® operating system).

What are needed are improved application sharing apparatus and methods.

BRIEF SUMMARY OF THE INVENTION

In one aspect, the invention features a method in accordance with which ones of the windows that are associated with a software process are identified in a screen layout on a local display of a sharer network node. On the sharer network node, a composite image of the identified windows as they are arranged in the screen layout and free of obscuration by any other windows in the screen layout is generated. The composite image is transmitted from the sharer network node to a viewer network node.

In one aspect, the invention features a method in accordance with which locally-generated commands that are derived from local input device events on a sharer network node are received. Remotely-generated commands that are derived from remote input device events on a remote viewer network node also are received. The received commands are processed into a command sequence. The command sequence is passed to a shared process executing on the sharer network node. In a screen layout on a local display of the sharer network node, one or more windows that are associated with the shared process are presented in accordance with the received command sequence. An image of the one or more windows as they are presented in the screen layout is generated. The image is transmitted from the sharer network node to the viewer network node.

The invention also features apparatus operable to implement the inventive methods described above and computer-readable media storing computer-readable instructions causing a computer to implement the inventive methods described above.

Other features and advantages of the invention will become apparent from the following description, including the drawings and the claims.

DETAILED DESCRIPTION OF THE INVENTION

Figure 1:
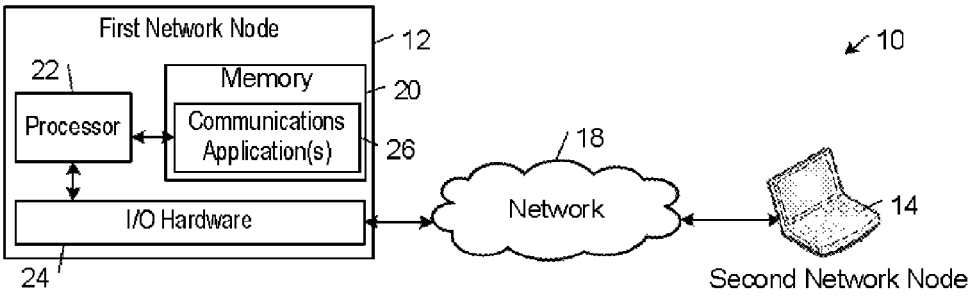
FIG. 1 is a diagrammatic view of an embodiment of a network communication environment that includes a first network node and a second network node.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

I. DEFINITION OF TERMS

A "window" is a visual area of a display that typically includes a user interface. A window typically displays the output of a software process and typically enables a user to input commands or data for the software process. A window that has a parent is called a "child window." A window that has no parent, or whose parent is the desktop window, is called a "top-level window." A "desktop" is a system-defined window that paints the background of a graphical user interface (GUI) and serves as the base for all windows displayed by all software processes.

The term "window scraping" refers to a process of extracting data from the display output of another software process. The extraction process is performed by a "scraper" software process.

A "layering order" (also referred to as the "z-order") is an ordering of overlapping two-dimensional objects, such as windows in a graphical user interface (GUI), along an axis (typically referred to as the "z-axis") that is perpendicular to a display on which the GUI is presented.

"Compositing" is the combining of visual elements from separate sources into a single composite image (also referred to herein as a "frame").

The term "obscuration" means the act or process of concealing or hiding by or as if by covering.

A "communicant" is a person who communicates or otherwise interacts with other persons over one or more network connections, where the communication or interaction may or may not occur in the context of a virtual area. A "user" is a communicant who is operating a particular network node that defines a particular perspective for descriptive purposes. A "sharer" is a communicant who is operating a sharer network node. A "viewer" is a communicant who is operating a viewer network node.

A "realtime contact" of a user is a communicant or other person who has communicated with the user via a realtime communications platform.

A "computer" is any machine, device, or apparatus that processes data according to computer-readable instructions that are stored on a computer-readable medium either temporarily or permanently. An "operating system" is a software component of a computer system that manages and coordinates the performance of tasks and the sharing of computing and hardware resources. A "software process" (also referred to as software, an application, computer software, a computer application, a program, and a computer program) is a set of instructions that a computer can interpret and execute to perform one or more specific tasks. A software process may have one or more "threads" of execution. A "shared software process" is a software process whose output is shared with a viewer network node. A "computer data file" is a block of information that durably stores data for use by a software application.

A "database" is an organized collection of records that are presented in a standardized format that can be searched by computers. A database may be stored on a single computer-readable data storage medium on a single computer or it may be distributed across multiple computer-readable data storage media on one or more computers.

A "data sink" (referred to herein simply as a "sink") is any of a device (e.g., a computer), part of a device, or software that receives data.

A "data source" (referred to herein simply as a "source") is any of a device (e.g., a computer), part of a device, or software that originates data.

A "network node" (also referred to simply as a "node") is a junction or connection point in a communications network. Exemplary network nodes include, but are not limited to, a terminal, a computer, and a network switch. A "server" network node is a host computer on a network that responds to requests for information or service. A "client" network node is a computer on a network that requests information or service from a server. A "network connection" is a link between two communicating network nodes. The term "local network node" refers to a network node that currently is the primary subject of discussion. The term "remote network node" refers to a network node that is connected to a local network node by a network communications link. A "connection handle" is a pointer or identifier (e.g., a uniform resource identifier (URI)) that can be used to establish a network connection with a communicant, resource, or service on a network node. A "sharer network node" is a network node that is sharing content with another network node, which is referred to as a "viewer network node. A "network communication" can include any type of information (e.g., text, voice, audio, video, electronic mail message, data file, motion data stream, and data packet) that is transmitted or otherwise conveyed from one network node to another network node over a network connection.

A "communicant interaction" is any type of direct or indirect action or influence between a communicant and another network entity, which may include for example another communicant, a virtual area, or a network service. Exemplary types of communicant interactions include communicants communicating with each other in realtime, a communicant entering a virtual area, and a communicant requesting access to a resource from a network service.

"Presence" refers to the ability and willingness of a networked entity (e.g., a communicant, service, or device) to communicate, where such willingness affects the ability to detect and obtain information about the state of the entity on a network and the ability to connect to the entity:

A "realtime data stream" is data that is structured and processed in a continuous flow and is designed to be received with no delay or only imperceptible delay. Realtime data streams include digital representations of voice, video, user movements, facial expressions and other physical phenomena, as well as data within the computing environment that may benefit from rapid transmission, rapid execution, or both rapid transmission and rapid execution, including for example, avatar movement instructions, text chat, realtime data feeds (e.g., sensor data, machine control instructions, transaction streams and stock quote information feeds), and file transfers.

A "virtual area" (also referred to as an "area" or a "place") is a representation of a computer-managed space or scene. Virtual areas typically are one-dimensional, two-dimensional, or three-dimensional representations; although in some embodiments a virtual area may correspond to a single point. Oftentimes, a virtual area is designed to simulate a physical, real-world space. For example, using a traditional computer monitor, a virtual area may be visualized as a two-dimensional graphic of a three-dimensional computer-generated space. However, virtual areas do not require an associated visualization to implement switching rules. A virtual area typically refers to an instance of a virtual area schema, where the schema defines the structure and contents of a virtual area in terms of variables and the instance defines the structure and contents of a virtual area in terms of values that have been resolved from a particular context.

A "virtual area application" (also referred to as a "virtual area specification") is a description of a virtual area that is used in creating a virtual environment. The virtual area application typically includes definitions of geometry, physics, and realtime switching rules that are associated with one or more zones of the virtual area.

A "virtual environment" is a representation of a computer-managed space that includes at least one virtual area and supports realtime communications between communicants.

A "zone" is a region of a virtual area that is associated with at least one switching rule or governance rule. A "switching rule" is an instruction that specifies a connection or disconnection of one or more realtime data sources and one or more realtime data sinks subject to one or more conditions precedent A switching rule controls switching (e.g., routing, connecting, and disconnecting) of realtime data streams between network nodes communicating in the context of a virtual area. A governance rule controls a communicants access to a resource (e.g., an area, a region of an area, or the contents of that area or region), the scope of that access, and follow-on consequences of that access (e.g., a requirement that audit records relating to that access must be recorded). A "renderable zone" is a zone that is associated with a respective visualization.

A "position" in a virtual area refers to a location of a point or an area or a volume in the virtual area. A point typically is represented by a single set of one-dimensional, two-dimensional, or three-dimensional coordinates (e.g., Cartesian coordinates, polar coordinates, or spherical coordinates) that define a spot in the virtual area. A coordinate can be defined as any single or plurality of numbers that establish location. An area typically is represented by the three-dimensional coordinates of three or more coplanar vertices that define a boundary of a closed two-dimensional shape in the virtual area. A volume typically is represented by the three-dimensional coordinates of four or more non-coplanar vertices that define a closed boundary of a three-dimensional shape in the virtual area.

A "spatial state" is an attribute that describes where a user has presence in a virtual area. The spatial state attribute typically has a respective value (e.g., a zone_ID value) for each of the zones in which the user has presence.

A "placemark" is a stored reference (e.g., a hyperlink) to a location in a virtual area. A placemark typically can be selected to present a view of the associated location in the virtual area to a user. The verb "placemark" means the act or operation of creating a placemark.

In the context of a virtual area, an "object" is any type of discrete element in a virtual area that may be usefully treated separately from the geometry of the virtual area. Exemplary objects include doors, portals, windows, view screens, and speakerphone. An object typically has attributes or properties that are separate and distinct from the attributes and properties of the virtual area. An "avatar" is an object that represents a communicant in a virtual area.

The term "double-click" refers to the act or operation of entering or inputting an execution command (e.g., double-clicking the left computer mouse button or by single-clicking a user interface button associated with an execute command, e.g., enter zone or view object). The term "shift-click" refers to the act or operation of entering or inputting a selection command (e.g., clicking the left computer mouse button) while the Shift key of an alphanumeric input device is activated. The term "shift-double-click" refers to the act or operation of entering or inputting an execution command while the Shift key of an alphanumeric input device is activated.

As used herein, the term "includes" means includes but not limited to, the term "including" means including but not limited to. The term "based on" means based at least in part on.

II. INTRODUCTION

The embodiments that are described herein enable application sharing with high fidelity, realtime performance, viewer immersion, and privacy protection. In some embodiments, the screen content that is associated with each thread of a software process can be determined and composited into a respective composite image (or frame) that is free of other window content. The contents of the windows that are associated with one or more software application threads on a network node can be broadcasted to other network nodes without risk of obscuration by the screen content (e.g., windows containing application content, messages, or dialog boxes) that might be generated by other software processes, thereby preventing corruption of shared window content by overlapping screen content that sometimes is generated by processes that are outside of the user's immediate control. This feature avoids the need for sharers to interrupt a presentation in order to remove obscuring screen content, thereby creating a more immersive collaboration experience for viewers of the shared window content. In addition, sharers don't have to worry that private information inadvertently will be shared along with the intended screen content, thereby maintaining the sharer's privacy.

Some embodiments also enable multichannel application sharing in which two or more communicants share applications and screen content with each other at the same time. These embodiments typically include an interface that allows each receiver to distinguish one shared window from another.

III. APPLICATION SHARING

A. Introduction

FIG. 1 shows an embodiment of an exemplary network communications environment 10 that includes a first network node 12 and a second network node 14 that are interconnected by a network 18. The first network node 12 includes a computer-readable memory 20, a processor 22, and input/output (I/O) hardware 24 (including a display). The processor 22 executes at least one communications application 26 that is stored in the memory 20. The second network node 14 typically is configured in substantially the same way as the first network node 12. In operation, the communications applications 26 typically provide one or more modes of communication between the first and second network nodes 12, 14 (e.g., text, voice, audio, and video). In addition, the communications applications 26 enable one-way or two-way application sharing between the first and second network nodes 12, 14.

Embodiments of the communications application may implement one or more of the following application sharing modes:

- Share all windows created by a given process;
- Share only one window and do not share any other windows;
- Share a given window and all child windows, where the child windows may belong to the same process that created the given window or they may belong to a different process.
- Share multiple applications. For instance, composing windows created by different processes into a single frame instead of sharing each of the applications independently.

Figure 2:
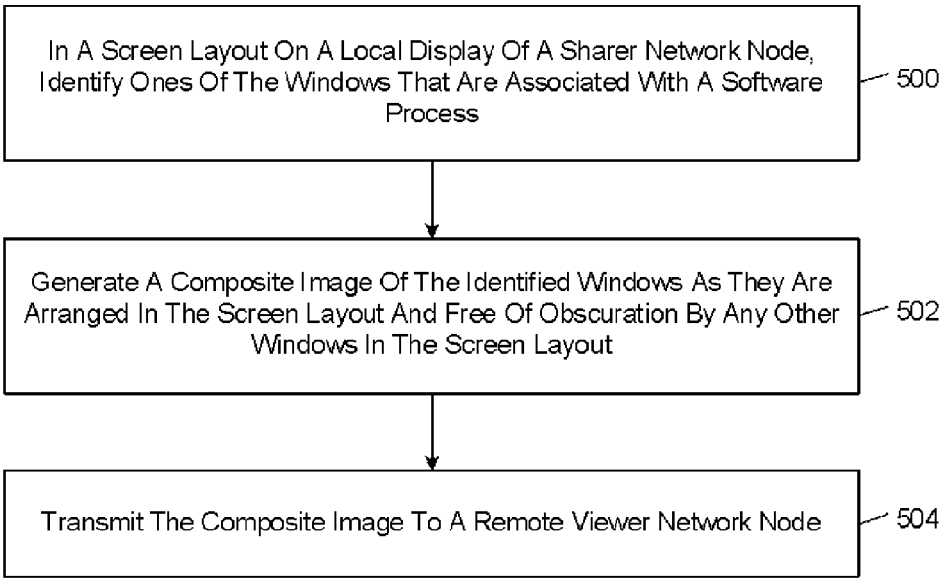
FIG. 2 is a flow diagram of an embodiment of an application sharing method.

FIG. 2 shows an embodiment of an application sharing method that is implemented by the communications application 26 operating on one or both of the first and second network nodes 12, 14. This process typically is performed in response to a request from a viewer network node to share one or more documents relating to a software process operating on a sharer network node.

In accordance with the method of FIG. 2, the communications application 26 identifies ones of the windows that are associated with a software process in a screen layout on a display of the sharer network node (FIG. 2, block 500). In some embodiments, the communications application 26 may identify all of the windows in the screen layout that are associated with the software process or it may identify ones of the windows in the screen layout that match a handle that is assigned to a thread of the software process. In some cases, this process involves identifying a parent window and at least one associated child window that are created by the software process thread. In some embodiments, the communications application 26 identifies all of the windows created by a designated group of software processes.

The communications application 26 generates a composite image of the identified windows as they are arranged in the screen layout and free of obscuration by any other windows in the screen layout (FIG. 2, block 502). In some embodiments, this process involves: determining a layering order of the identified windows in relation to each other that corresponds to the relative layering order of the identified windows in the screen layout; for each of the identified windows, retrieving a respective image of the window; and compositing the retrieved images into the composite image in accordance with the determined layering order. In some embodiments, the process of determining the layering order involves: for each of the windows in the screen layout, generating a z-order list that associates a respective z-order value with a respective window handle of the window; and deriving the layering order of the identified windows from the z-order list The process of deriving the layering order typically involves: for each of the z-order values in the z-order list, matching the associated window handle with the window handle of a respective one of the identified windows; and ordering the identified windows in the layering order in accordance with the respective z-order values in the z-order list associated with the ones of the z-order values determined to match the window handles of the identified windows.

In addition to preventing obscuration by other windows, some embodiments also prevent obscuration of the selected windows as a result of the windows being partially or completely off-screen (e.g., outside the visible desktop window that contains the screen layout). For example, a respective image of each of the identified windows is stored in a respective memory buffer, and the process of generating the composite image involves retrieving each of the images from the respective memory buffers and compositing the retrieved images into the composite image. For example, in some exemplary embodiments, each of the windows is a layered window whose screen data is stored in a respective memory buffer through a programmatic call to the Microsoft® Win32 application programming interface (API), which is available in Microsoft® Windows® operating systems versions 2000 and later. These operating systems provide an extended window style that is invoked by setting the WS_EX_LAYERED window style bit. The WS_EX_LAYERED style bit that is associated with a particular window may be set by the shared software process at window creation time (e.g., via the CreateWindowEx API call) or it may be set by the communications application 26 after creation time (e.g., via SetWindowLong API call with GWL_EXSTYLE). With the WS_EX_LAYERED window style bit set for a window, the operating system redirects the drawing of the window into an off-screen bitmap and buffer, which can then be accessed by the communications application 26 for generating the composite image. Similar layered windows functionality is available from other operating systems (e.g., X-Windows on a UNIX based operating system).

After the composite image has been generated, the communications application 26 transmits the composite image to the viewer one of the first and second network nodes (i.e., the one of the first and second network nodes that receives the composite image) 12, 14 (FIG. 2, block 504). In some embodiments, this process involves transmitting the composite image to each of the remote viewer network nodes that requested (or subscribed to) to view the shared content on the sharer network node. The composite image (and subsequent updates) is transmitted to the subscribing viewer network nodes over respective realtime data stream connections that are established between the sharer network node and the viewer network nodes.

Figure 3:
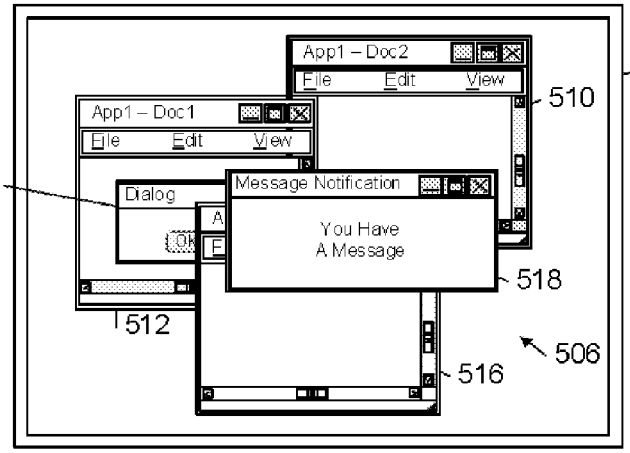
FIG. 3 is a diagrammatic view of an embodiment of a screen layout on a display of a sharer network node.

FIG. 3 shows an embodiment of a screen layout 506 on a display 508 of the first network node 12, which is acting as a sharer network node. The screen layout 506 includes a first window 510, a second window 512 that is parent of a child window 514, a third window 516, and a fourth window 518. The first window 510, the second window 512 and its child window 514 are created by respective threads of a first software process (e.g., the Microsoft® Word® document processing software process), the third window is created by a thread of a second software process (e.g., Microsoft® Excel® spreadsheet software process), and the fourth window 518 is created by a thread of a third software process (e.g., the Microsoft® Outlook® personal information manager software process). The first and second windows 510, 512 are the main windows that are created by their respective software process threads (e.g., created by the WinMain entry point function, optionally with the WS_EX_LAYERED bit set in a Microsoft® Windows® application environment). In a Microsoft® Windows® application environment, aspects of the appearance of the child window 514 typically are affected by its parent window 512. For example, the parent window 512 typically defines the coordinate system that is used to position the child window 514 on the display 508. In addition, in some implementations, the child window 514 may be clipped so that no part of the child window 514 appears outside the borders of its parent window 512.

Figure 4A:
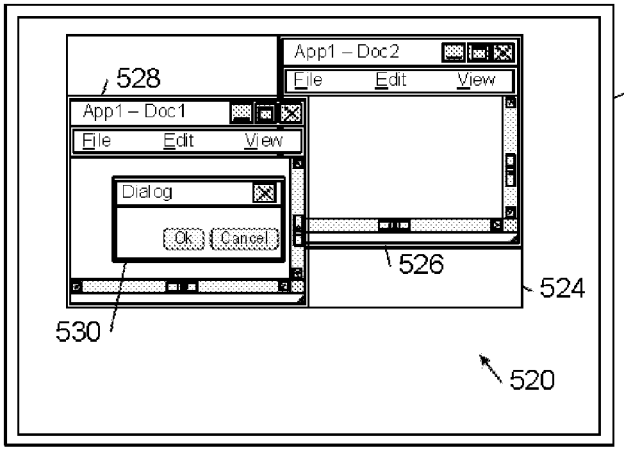
FIG. 4A is a diagrammatic view of an embodiment of a screen layout on a display of a viewer network node.

FIG. 4A shows an embodiment of a first screen layout 520 on a display 522 of the second network node 14, which is acting as a viewer network node in accordance with a first application sharing example. In this example, the communicant on the first network node 12 is acting as a sharer who has elected to share all of the windows of the first software process (App1) with the second network node 14. Thus, the screen layout 520 consists of a composite image 524 that includes respective regions 526, 528, 530 that show the first window 510, the second window 512, and the child window 514, which are created by respective threads of a first software process operating on the first network node 14. The regions 526, 528, 530 show the first window 510, the second window 512, and the child window 514 as they are arranged in the screen layout 506 on the first network node 14. The regions 526, 528, 530 also are free of obscuration by any other windows in the screen layout 506 on the first network node 14. For example, the third window 516 and the fourth window 518 (which obscured underlying portions of the first window 510, the second window 512, and the child window 514 in the screen layout 506) are omitted from the composite image 524; in addition, the portions of the first window 510, the second window 512, and the child window 514 that are obscured in the screen layout 506 have been replaced by the appropriate contents of the first window 510, the second window 512, and the child window 514 in the composite image 524.

Figure 4B:
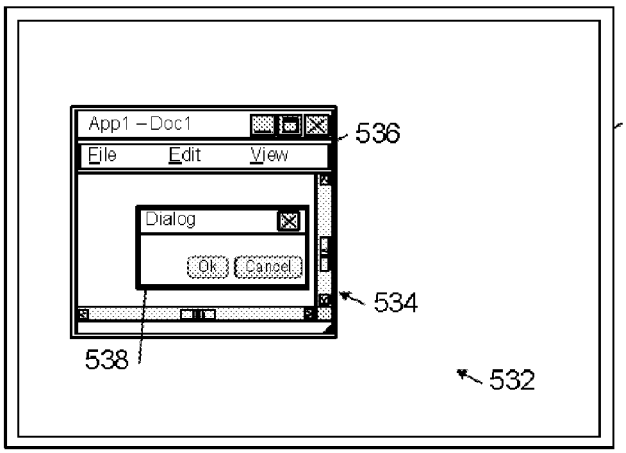
FIG. 4B is a diagrammatic view of an embodiment of a screen layout on a display of a viewer network node.

FIG. 4B shows an embodiment of a second screen layout 532 on the display 522 of the second network node 14, which is acting as a viewer network node in accordance with a second application sharing example. In this example, the communicant on the first network node 12 is acting as a sharer who has elected to share all of the windows that are associated with only one of the threads (i.e., the thread responsible for creating the second window 512 and its child window 514) of the first software process (App1). Thus, the screen layout 532 consists of a composite image 534 that includes respective regions 536, 538 that show the second window 512 and the child window 514. The regions 536, 538 show the second window 512 and the child window 514 as they are arranged in the screen layout 506 on the first network node 14. The regions 536, 538 also are free of obscuration by any other windows in the screen layout 506 on the first network node 14. For example, the first window 510, the third window 516, and the fourth window 518 are omitted from the composite image 534; in addition, the portions of the second window 512 and the child window 514 that are obscured in the screen layout 506 have been replaced by the appropriate contents of the second window 512 and the child window 514 in the composite image 534.

B. Application Sharing Embodiments

1. Introduction

In some embodiments, application sharing is initiated after a sharer network node has published one or more applications or documents that are available to share and at least one viewer has subscribed to at least one of the published applications or documents. In some embodiments, the sharer can publish a shared application or document to a viewscreen object that is associated with a virtual area and the viewer can subscribe to the shared content by activating the viewscreen object in the virtual area (e.g., by double-clicking on the viewscreen object with a user input device).

The viewer typically is granted one of two types of access to the shared content: view access, which allows the viewer to only passively view the shared content; and control access, which allows the viewer to view, control, edit, and manipulate the shared content. The type of access that is granted to the viewer can be set by the sharer or by one or more governance rules that are associated with the context in which the sharing takes place (e.g., a governance rule that is associated with a zone of a virtual area, as described below in section IV).

The shared content typically is streamed from the sharer network node to the viewer network node in the form of streaming bitmaps of the windows on the sharers display that are associated with the shared application or document The bitmap of each window can be streamed separately or already composited. The bitmaps typically are compressed before being streamed. If the viewer has only view access, then the viewer can only passively view images of the shared windows on the sharers display. If the viewer has control access, then the viewer network node can transmit remote control commands that are generated by a user input device (e.g., a keyboard, a computer mouse, a touchpad, and a touch screen) to the sharer network node for controlling, editing, and manipulating the shared content on the sharers network node.

2. Application Sharing Service

In some embodiments, the application sharing functionality of the communications application 26 is provided by a Scraper module, which is a plug-in for an Application Sharing Service that implements a platform specific part of the application sharing. This embodiment implements the application sharing mode in which all windows created by a shared application automatically are shared with subscribing network nodes. This section describes an exemplary embodiment of the Scraper module and the Application Sharing Service that are implemented in a Microsoft® Windows® application environment that provides layered windows functionality.

a. Classes

Figure 5:
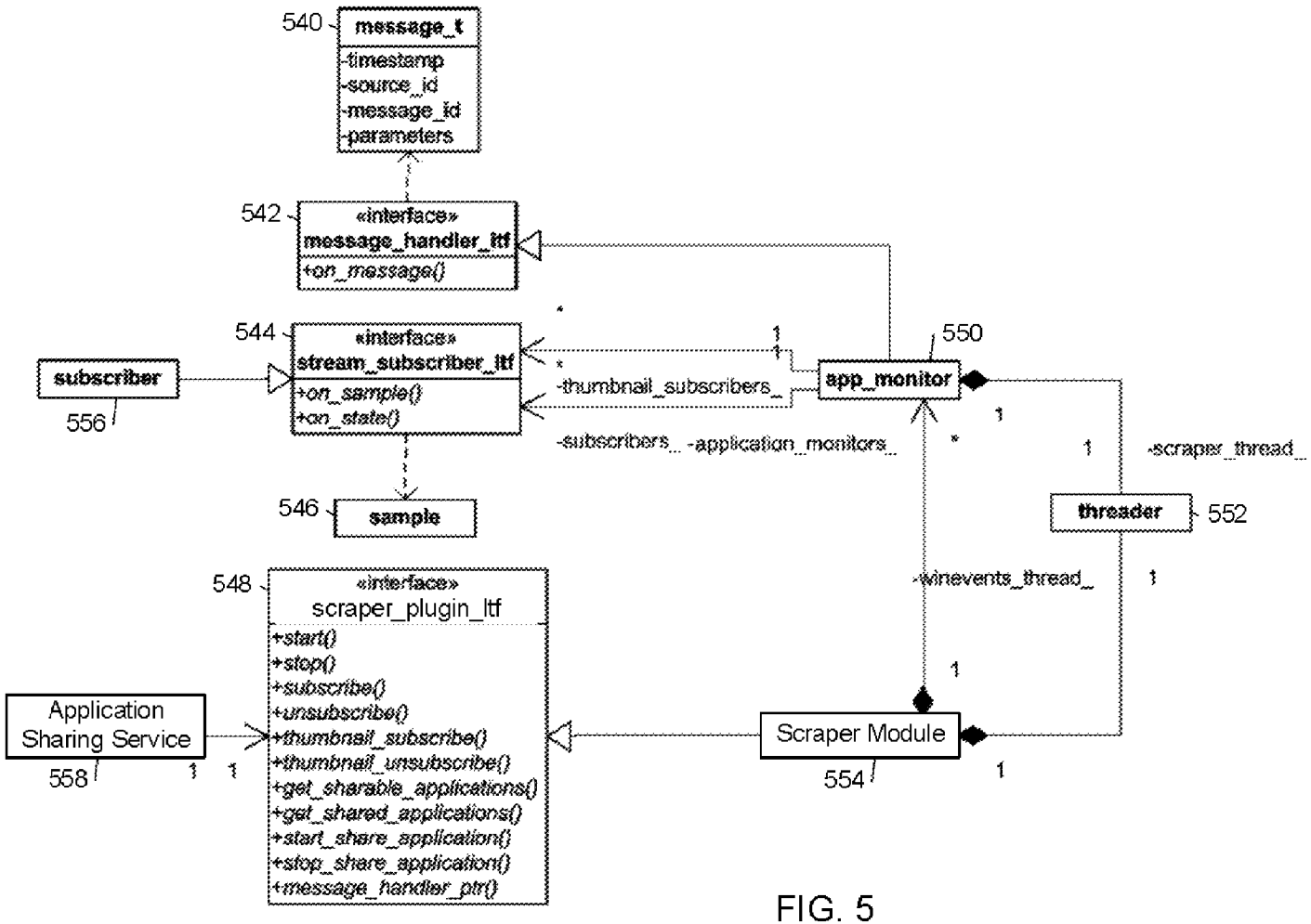
FIG. 5 is a diagrammatic view of an embodiment of an application sharing class model.

FIG. 5 shows an embodiment of an application sharing class model. In this model, the blocks 540, 542, 544, 546, and 548 define the interface between Application Sharing Service and Scraper module, the blocks 550, 552, 554 are the classes that implement Scraper module, and the blocks 556, 558 are the classes in the Application Sharing service that use the interfaces.

b. Methods (i) The Methods Start and Stop

Before Application Sharing Service calls any method on the Scraper module it calls the start method and, during shutdown, it calls the stop method. In the illustrated embodiment no calls can be made before the start method was called and after the stop method was called.

In the start method, the Scraper module starts the thread that listens for WinEvents. The Scraper module listens for WinEvents to get notifications when windows and menus are created/destroyed and shown/hidden.

In the stop method, the Scraper module stops all the application monitors and then shuts down the thread that is listening for WinEvents.

When a WinEvent notification is received, the Scraper module gets the thread identifier (ID) and the process ID for the window. The Scraper module then looks up a monitor by the process ID and notifies the application monitor about the event. In response to a notification that a window was destroyed, the Scraper module notifies all of the application monitors of the event since the process and thread IDs are not available.

(ii) The Method Get_Sharable_Application

Figure 6:
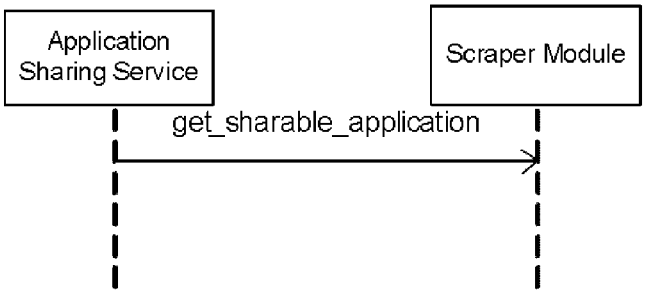
FIG. 6 is a diagrammatic view of an embodiment of application sharing components implementing a method in an embodiment of an application sharing process.

As shown in FIG. 6, the Application Sharing Service can request the Scraper module to provide a list of applications that can be shared. In response, the Scraper module builds up the list of IDs and titles of the topmost overlapped windows on the desktop that is presented on the display of the sharer network node. In the illustrated embodiments, the list is built from the processes that currently are running on the sharer network node. In other embodiments, the list also includes the processes that "can be running" on the node. This for instance might include all Microsoft® Word® documents that the sharer might want to share, but currently are not running, or another application (e.g., a calculator application) that the sharer might want to share, but currently is not running.

(iii) The Method Start_Share_Application

Figure 7:
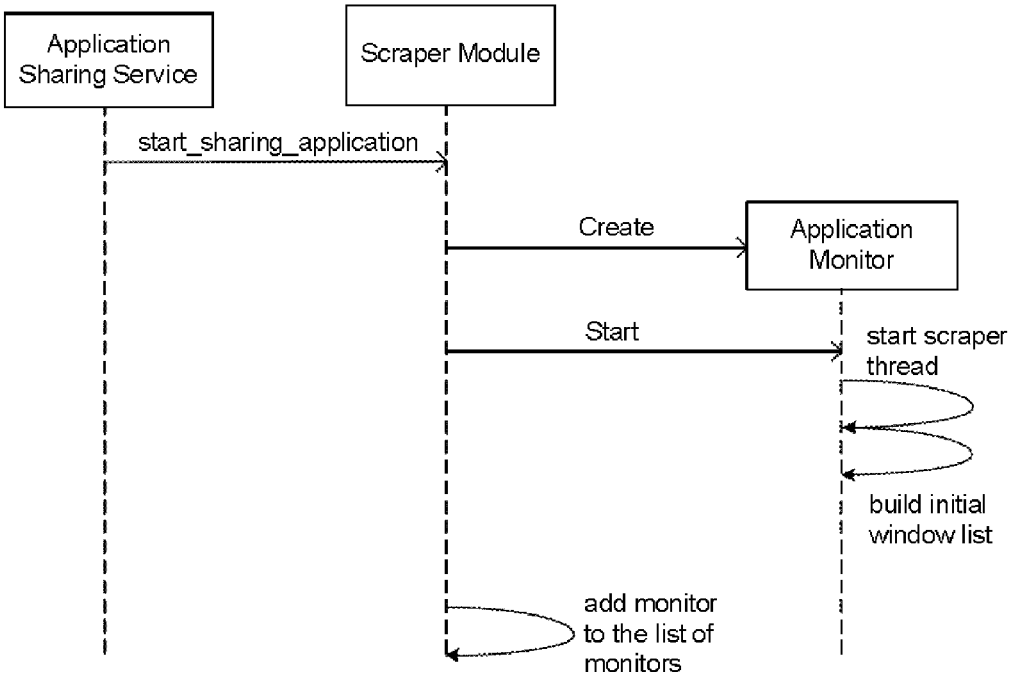
FIG. 7 is a diagrammatic view of an embodiment of application sharing components implementing a method in an embodiment of an application sharing process.

Referring to FIG. 7, when the Application Sharing service starts sharing an application, the Scraper module creates an instance of the application monitor that will be responsible for scraping the application windows. The application monitor enumerates all topmost windows on the desktop. The application monitor uses the result of this enumeration as an initial list of the windows. The application monitor determines which windows in the initial list belong to the application being shared. The application monitor then spawns a scraper thread. The scraper thread is responsible for scraping content of the application windows, composing all the application's windows to the final bitmap, and sending the bitmap frame to all the subscribing network nodes.

(iv) The Method Stop_Share_Application

Figure 8:
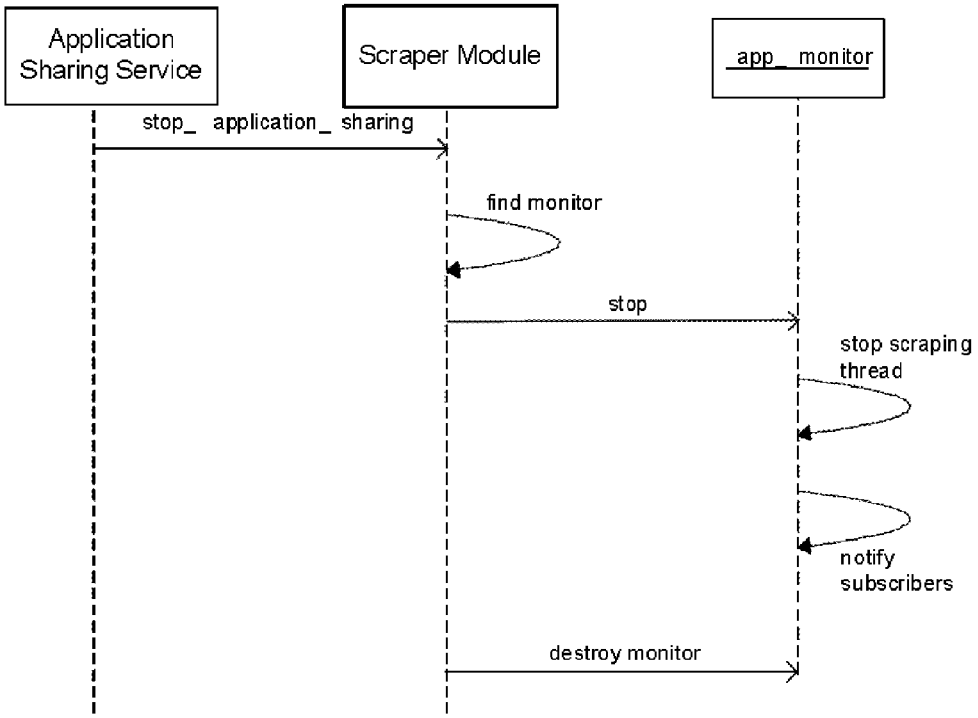
FIG. 8 is a diagrammatic view of an embodiment of application sharing components implementing a method in an embodiment of an application sharing process.

Referring to FIG. 8, stopping application sharing takes care of gracefully stopping application monitor. In this process, the application monitor will shutdown the scraping thread, which makes sure that no more samples are produced. After that it notifies all the subscribing network nodes that they are unsubscribed. Once all the references to the application monitor are gone the monitor will be destroyed.

(v) The Method Get_Shared_Applications

This method returns a list of applications being shared.

(vi) The Method Subscribe

Figure 9:
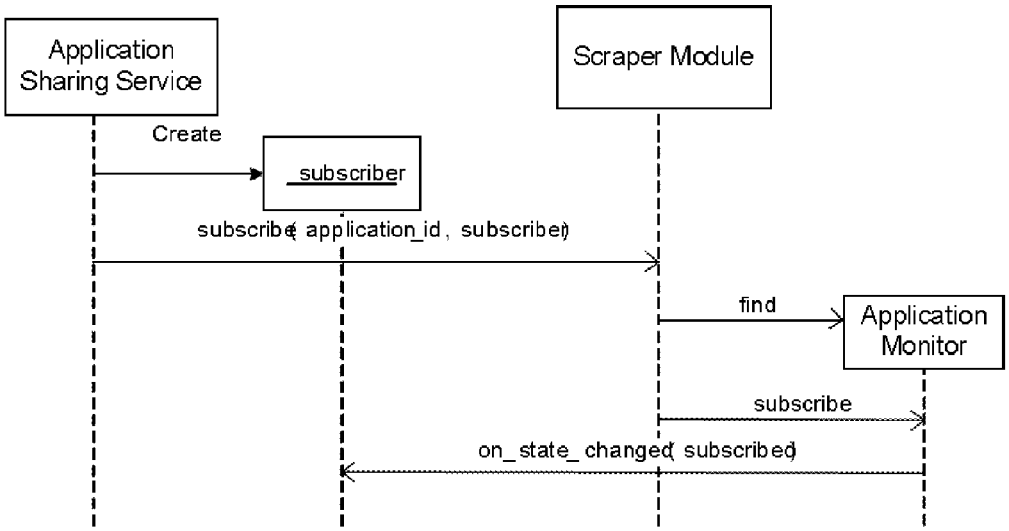
FIG. 9 is a diagrammatic view of an embodiment of application sharing components implementing a method in an embodiment of an application sharing process.

Referring to FIG. 9, the subscribe method expects as parameters a reference to a subscriber and an ID of the process to share. The subscriber is a class (see FIG. 5) that implements stream_subscriber_itf, as shown in the class model shown in FIG. 5. The Scraper module finds the monitor by the application ID and adds the subscriber to the monitor. The next time the application monitor generates a frame it will deliver the frame to this subscriber as well.

(vii) The Method Unsubscribe

Figure 10:
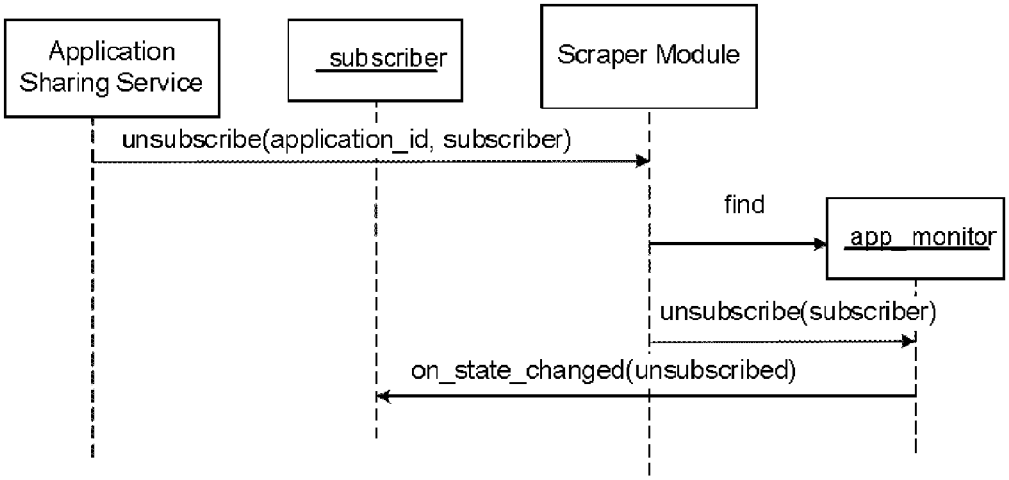
FIG. 10 is a diagrammatic view of an embodiment of application sharing components implementing a method in an embodiment of an application sharing process.

Referring to FIG. 10, the subscribe method expects as parameters a reference to a subscriber and ID of the process to share. This method finds the shared application by ID and tells it to remove the referenced subscriber. On removing the referenced subscriber, the application monitor will notify the subscriber about the state change. The application monitor also checks shared process state and, if the process exits, then application monitor will notify all the subscribers about the state change, unsubscribe all the subscribers and will terminate itself since there is nothing to monitor.

c. Window Scraping

Each application monitor has a thread that wakes up on a periodic basis and performs window scraping.

Figure 11A:
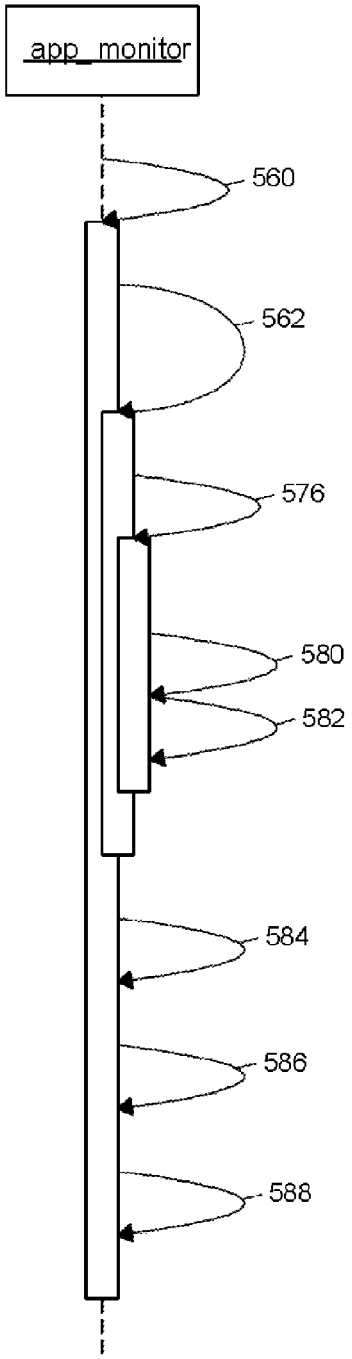
FIGS. 11A and 11B are flow diagrams of an embodiment an application sharing method.
Figure 11B:
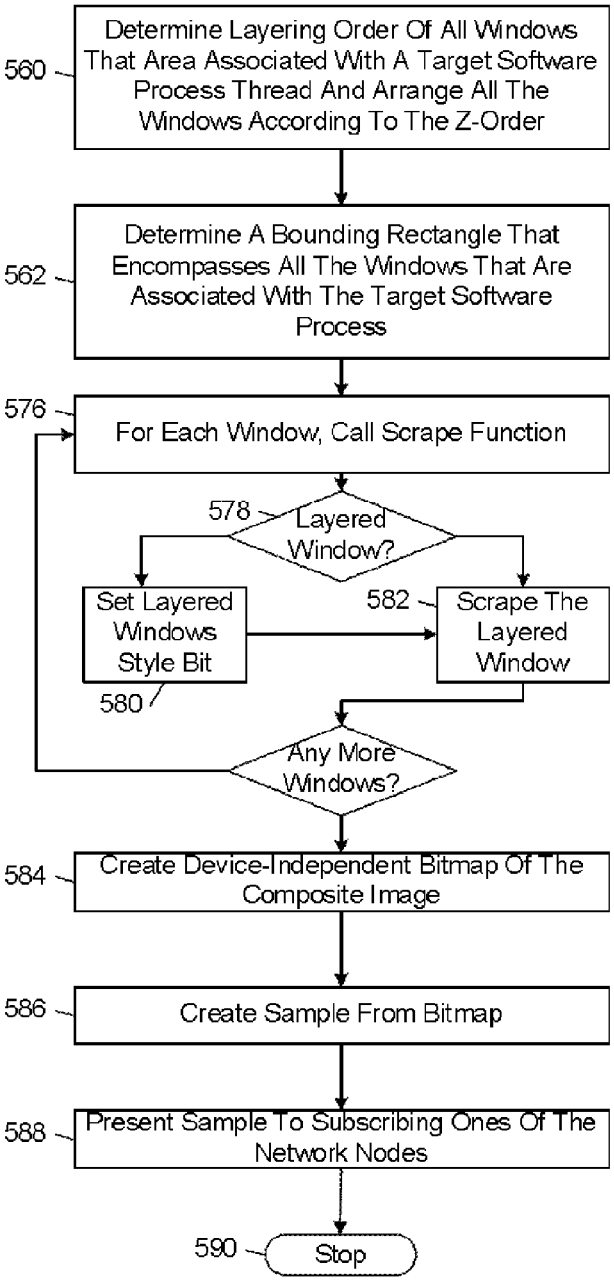

FIGS. 11A and 11B show an embodiment of an exemplary window scraping method.

In accordance with the method of FIGS. 11A and 11B, the Scraper module determines the z-order of all the windows that are associated with a shared software process and arranges all the windows according to the z-order (FIG. 11B; block 560).

Figure 12:
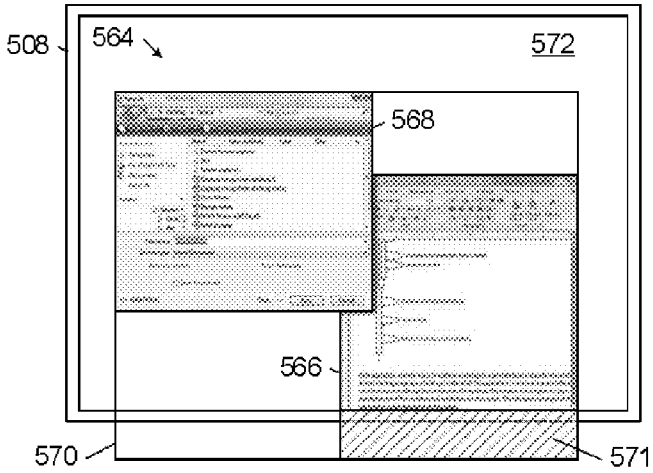
FIG. 12 is a diagrammatic view of an embodiment of a screen layout on a display of a sharer network node.

The scraper module determines a bounding rectangle that encompasses all the windows that are associated with the shared software process (FIG. 11B; block 562). For example, FIG. 12 shows a screen layout 564 that includes a Microsoft® Word® main window 566 and a Save As dialog box 568. The Scraper module calculates the rectangle 570, which is the smallest bounding box that encompasses both windows, including any off-screen content (e.g., the shaded area 571 that corresponds to the bottom of the main window 566 that is outside the visible desktop window 572). The bounding rectangle 570 defines the size of the composite bitmap of all the windows to be shared.

For each of the windows that are associated with the shared software process, the Scraper module calls a scrape function (FIG. 11B, block 576). If the window is not a layered window (FIG. 11B, block 578), the scrape function sets the WS_EX_LAYERED bit that is associated with the window via the SetWindowLong API call with GWL_EXSTYLE (FIG. 11B, block 580). The scrape function then scrapes the layered window (FIG. 11B, block 582). In this process, the scraper module retrieves images of the windows, including the parts that are obscured by other windows or is outside the visible desktop window (e.g., the shaded area 571 shown in FIG. 12) and paints the retrieved images into the composite image. The windows are scraped according to the z-order so the topmost window is painted on top of all the window images in the final composite image. After the scraper module has estimated the bounding rectangle, the scraper module captures a screen image of the shared windows. In a Microsoft® Windows® application environment for each of the windows, the Scraper module makes a GetDC( ) function call to GDI (the graphics device interface) that retrieves a handle to a display device context (DC) for the window. The Scraper module performs an iterative capturing of each window. In this process; BitBlt( )is called for each window being shared and the image data of each window is superimposed in the target DC according to the relative positions (in the x, y, and z axes) of the windows in the screen display. The BitBlt function performs a bit-block transfer of the image data corresponding to a block of pixels from the specified source device context into a destination device context. The screen image constitutes the initial composite image. Performing iterative BitBlt( ) requests automatically filters out screen data from unwanted windows and allows individual window compressed bitmaps to be sent, instead of just the compressed composited bitmap.

After completing the scraping process, the Scraper module creates a device independent bitmap of the composite image (FIG. 11B, block 584). The Scraper module then creates a sample from the bytes of the bitmap (FIG. 11B, block 586). The sample is a bitmap in a temporal sequence of bitmaps that are captured. In some embodiments, the sample is the current composite image. The current sample depicts how the shared application is displayed at current time. Successive samples give the viewers the perception that the shared application is not just a sequence of images, but rather is a live application. Once sample is created, the Application Sharing service presents the sample to all the subscribing network nodes, one by one (FIG. 11B, block 588). Samples typically are transmitted to the subscribing network nodes only if there has been a change in the composite image since the last sample was transmitted. The sample typically is compressed before being transmitted to the subscribing network nodes. The Scraper module then goes to sleep until the next scheduled time to scrape another image (FIG. 11B, block 590). The Application Sharing service contemporaneously (i.e., during the same period of time, e.g., during the period between scraping cycles) transmits the sample of the composite image to each of the subscribing remote network nodes.

Figure 13:
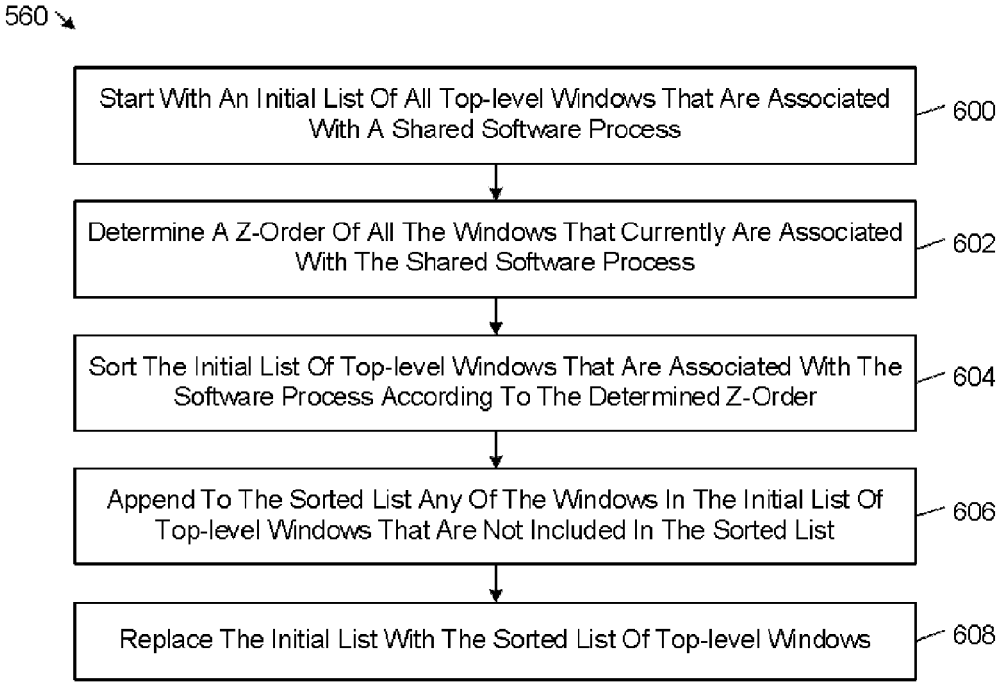
FIG. 13 is a flow diagram of an embodiment of a method of determining the layering order of the windows associated with a shared software process.

FIG. 13 shows an embodiment of a method by which the Scraper module determines the current z-order of the windows that are associated with a shared software process (FIG. 11B, block 560).

The Scraper module starts with an initial list of all top-level windows that are associated with the shared software process (FIG. 13, block 600). The initial list may be obtained from a previous iteration of the scraping process shown in FIGS. 11A and 11B. Alternatively, the initial list may be obtained directly by querying the application environment For example, in some embodiments, the Scraper module is implemented in a Microsoft® Windows® application environment. In these embodiments, each software process thread has an entry point function called WinMain, which registers the window class for the main window by calling the RegisterClass function, and creates the main window by calling the CreateWindowEx function. After creating a window, the creation function returns a window handle that has the HWND data type and uniquely identifies the window; the window handle is used to direct software process actions to the window. In these embodiments, the Scraper module obtains a handle to each of the top-level windows associated with the shared software process thread by calling the EnumWindows function, which enumerates all the windows on the desktop and then query the process this window belongs to by calling GetWindowThreadProcessId.

The Scraper module determines a z-order of all the windows that currently are associated with the shared software process (FIG. 13, block 602). When implemented in a Microsoft® Windows® application environment, the Scraper module obtains a handle to each of the windows on the desktop window by calling the EnumChildWindows function, which enumerates the child windows that belong to the desktop window in z-order by passing the handle to each child window, in turn, to a callback function of the Scraper module. The Scraper module recursively iterates through all the windows on the desktop and identifies those windows that belong to the shared software application. In this process, the Scraper module identifies the children of that desktop that correspond to the top-level windows of the shared software application. For each of the matching top-level windows, the Scraper module calls a function that recursively iterates through the children of the matching top-level window; the function recursively calls itself.

The Scraper module sorts the initial list of top-level windows that are associated with the software process according to the determined z-order (FIG. 13, block 604).

The Scraper module appends to the sorted list any of the windows in the initial list of top-level windows that are not included in the sorted list (FIG. 11, block 606). This step is used to cover any windows (e.g., a window that was deleted after the sorting process started) that might have been missed.

The Scraper module replaces the initial list with the sorted list of top-level windows (FIG. 13, block 608).

d. Remote Access

If the viewers have only view access, then the Application Sharing Service on the sharer network node only transmits the composite images of the shared window content (in the form of samples) to the subscribing ones of the viewer network nodes. The viewers on the viewer network nodes can only passively view the composite images of the shared windows on the sharers display.

If the viewers have control access, on the other hand, then the Application Sharing Service on the sharer network node transmits the composite images of the shared window content (in the form of samples) to the subscribing ones of the viewer network nodes. In addition, the Scraper module combines commands that are received from the viewer network nodes with the commands that are generated by the sharer on the sharer network node, and passes the combined set of commands to the shared application. This allows the viewers to control, edit, and manipulate the shared application on the sharer network node. The commands typically are derived from events that are generated by one or more user input devices (e.g., a keyboard, a computer mouse, a touchpad, and a touch screen) on the viewer and sharer network nodes.

Figure 14:
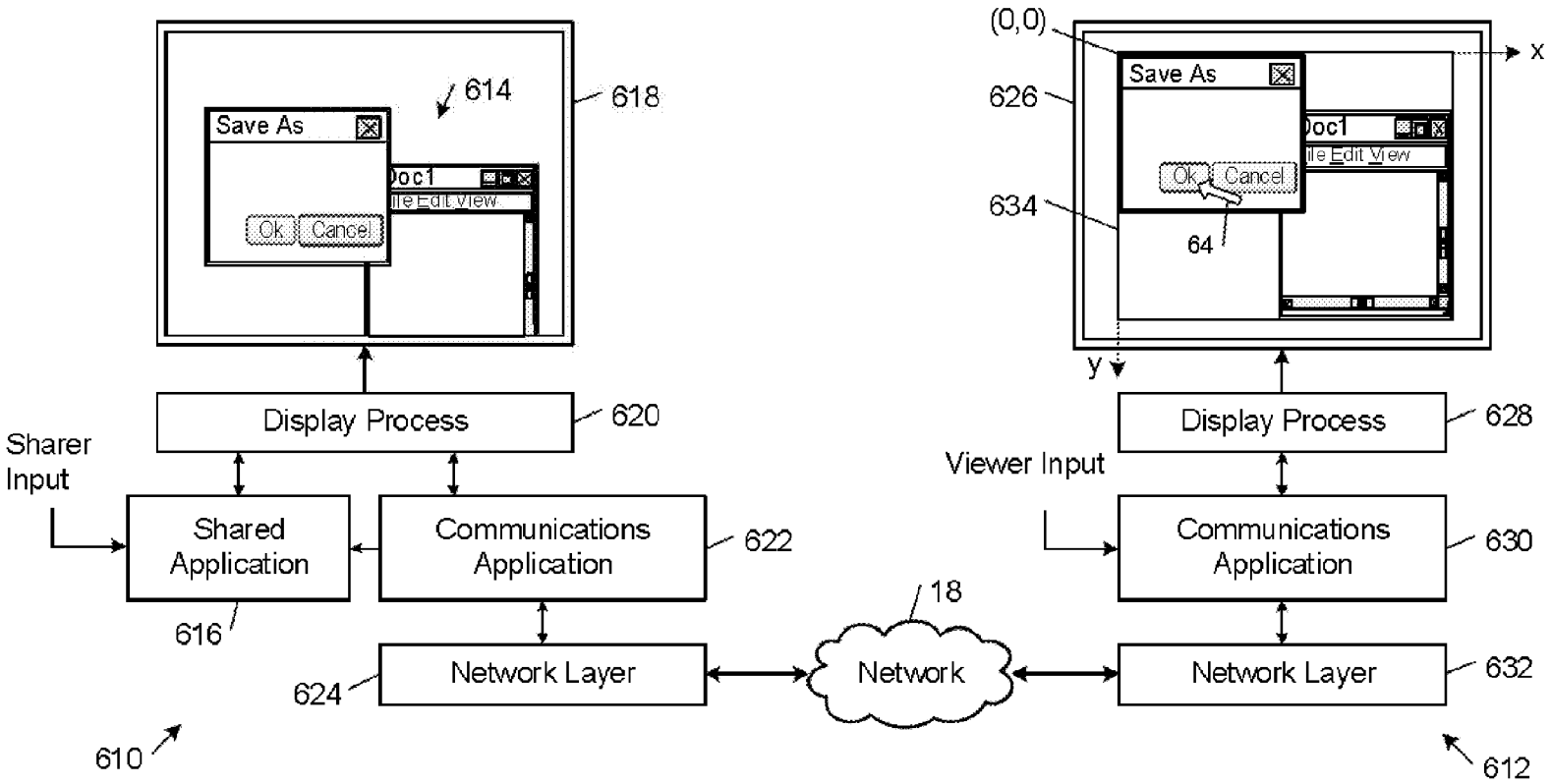
FIG. 14 is a block diagram of an embodiment of a shared network node implementing an embodiment of an application sharing process in connection with an embodiment of a viewer network node.

FIG. 14 shows an embodiment 610 of the first network node 610 and an embodiment 612 of the second network node 612. In the illustrated embodiment, the first network node 610 (which is referred to as the "sharer network node 610") shares window content 614 that is associated with a shared process 616 with the second network node 612 (which is referred to as the "viewer network node 612"). The sharer network node 610 includes a display 618 on which the window content 614 is presented, a display process 620, an embodiment 622 of the communications application 26, and a network layer 624. Similarly, the viewer network node 612 includes a display 626, a display process 628, an embodiment 630 of the communications application 26, and a network layer 632.

The display processes 620, 628 provide the display facilities of the sharer network node 610 and the viewer network node 612, respectively. The display facilities control the writing of visual contents on the sharer and viewer displays 618, 626. In some embodiments, the display facilities include a graphic device interface (e.g., the GDI available in Microsoft® Windows® application environments) that provides functions that can be called by software processes in order to present visual content on the displays 618, 626.

The network layers 624, 632 provide the networking facilities of the sharer network node 610 and the viewer network node 612, respectively. The network facilities include, for example, networking communications protocol stacks and networking hardware that perform processes associated with sending and receiving information over the network 18.

The communications applications 622, 630 respectively provide various communications facilities (including application sharing facilities) to the sharer network node 610 and the viewer network node 612. In the illustrated embodiment, the communications application 622 on the sharer network node 610 generates a composite image 634 of the shared window content 614 on the sharer's display, transmits the composite image 634 over the network 18 to the viewer network node 612 for presentation on the viewer's display 626, and grants the viewer remote control access to the shared window content 614. The communications application 630 on the viewer network node 612 controls the presentation of the composite image 634 on the display 626, transforms user input into commands, and transmits the commands to the sharer network node 610.

Figure 15:
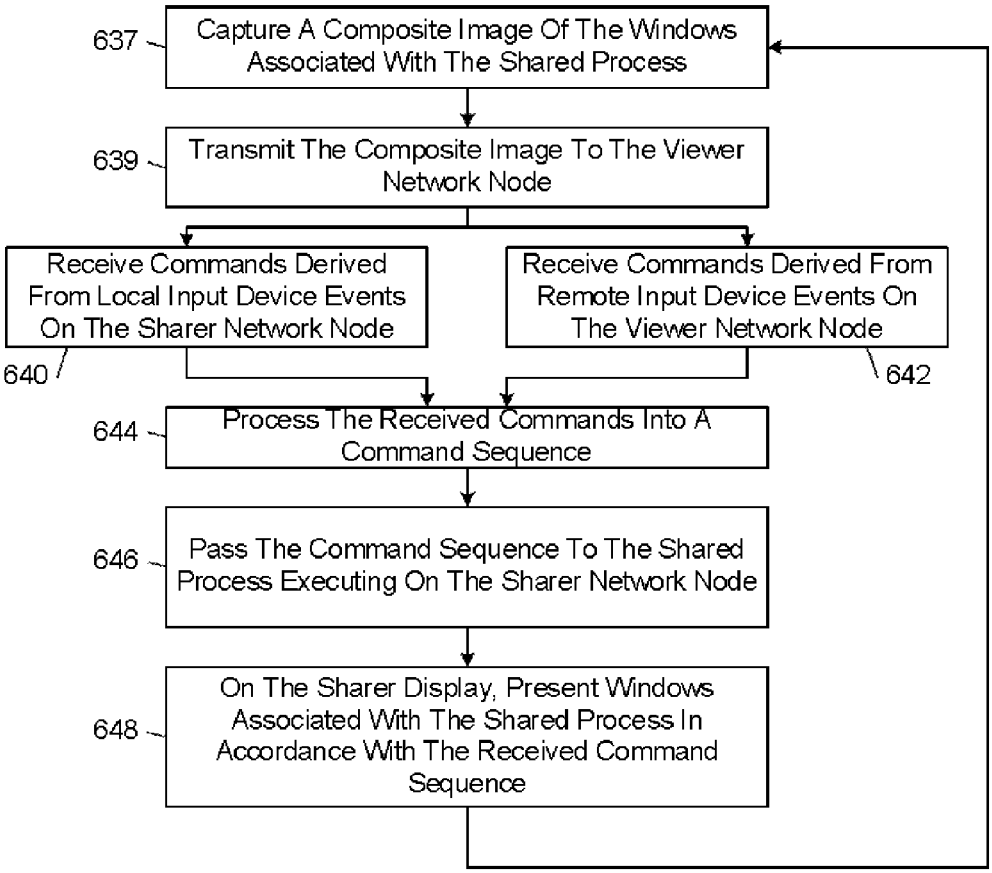
FIG. 15 is a flow diagram of an embodiment of an application sharing method.

FIG. 15 shows an embodiment of an application sharing method that is implemented by the sharer network node 610 in the application sharing context shown in FIG. 14.

In accordance with the method of FIG. 15, the communications application 622 on the sharer network node 610 captures a composite image of the windows that are associated with the shared software process (FIG. 15, block 637). In some embodiments, the window scraping process described above is used to capture the composite image. The communications application 622 transmits the composite image to the viewer network node 612 (FIG. 15, block 639). In this process, the communications application passes a sample of the composite image to the network layer 624, which converts the sample into a network format and transmits the converted sample to the viewer network node 612 over the network 18.

The communications application 622 receives commands that are derived from local input device events generated on the sharer network node 610 (FIG. 15, block 640). Contemporaneously, the communications application 622 receives commands that are derived from remote input device events that are generated on the viewer network node 612 (FIG. 15, block 642). In this context, the commands are directives or instructions to perform tasks, where the directives or instructions are derived from interpretations of input device events that are initiated by user actions (or inputs) on one or more input devices (e.g., clicking one or more buttons of a computer mouse or keys of a computer keyboard). Some pointer input device events, such a computer mouse, touch pad, and touch screen events, are tied to the position of a pointer (or cursor) in graphical user interface that is presented on a display. These types of input device events typically are converted into commands that include both an input type parameter value that describes the type of input (e.g., left-click, right-click, left button double-click, scroll wheel, etc.) and a location parameter value that describes where the input was entered with respect to a context-dependent coordinate system.

The operating systems on the sharer and viewer network nodes 610, 612 typically convert the pointer input device events into user commands, where the location parameter values are defined with respect to the coordinate system of the main window of the graphical user interface (e.g., the desktop window in a Microsoft® Windows® application environment). The sharer's input commands that are received by the communications application 622 (FIG. 15, block 640) are the operating system generated user commands; these commands also are used to control the operation of user mode software processes (e.g., the shared process 616) on the sharer network node 610. The viewers input commands that are received by the communications application 622 (FIG. 15, block 642), on the other hand, typically are versions of the operating system generated user input commands. In particular, before transmitting the viewer commands to the sharer network node 610, the communications application 630 on the viewer network node 612 remaps the location parameter values in the operating system generated commands from the coordinate system of the main window of the graphical user interface on the display 626 to a coordinate system of the composite image 634. For example, in the illustrated embodiment, the location parameter values are remapped to a coordinate system that has an origin (0,0) at the upper left corner of the composite image 634 and has x and y axes that extend along the bottom and left edges of the composite image 634.

The communications application 622 processes the received commands into a command sequence (FIG. 15, block 644). In this process, the communications application 622 typically remaps the location parameter values in the viewer's commands from the coordinate system of the composite image 634 to the coordinate system of the main window of the graphical user interface on the display 618. The communications application then arranges the received commands into a sequence in order of time of receipt, and stores the resulting sequence of commands into a memory buffer.

The communications application 622 passes the command sequence to the shared process 616 (FIG. 15, block 646). In this process, for each command, the communications application typically invokes Win32 API functions that allows it to specify a window that Windows will send the command to.

The shared process 616 calls one or more graphical device interface functions that are provided by the display process 620 to present the windows that are associated with the shared software process 616 on the sharer display 618 in accordance with the received command sequence (FIG. 15, block 648).

The process (FIG. 15, blocks 640-648) is repeated in accordance with a specified update schedule.

IV. AN EXEMPLARY OPERATING ENVIRONMENT

A. System Architecture

1. Introduction

Figure 16:
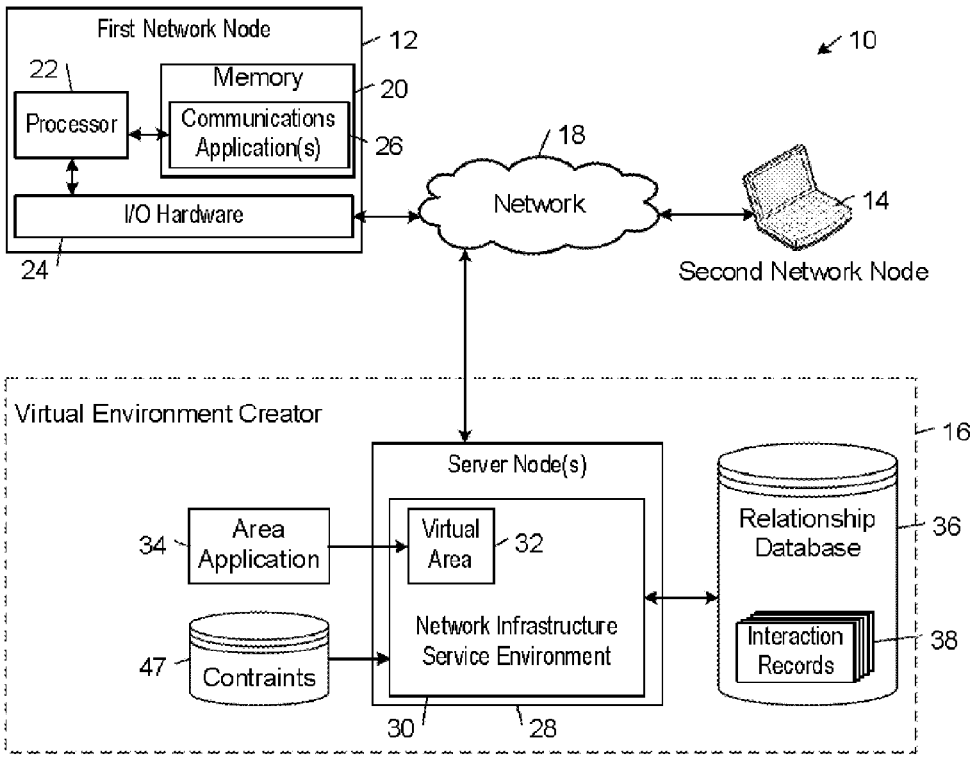
FIG. 16 is a diagrammatic view of an embodiment of a network communication environment that includes the first network node of FIG. 1, the second network node of FIG. 1, and a virtual environment creator.

FIG. 16 shows an embodiment of an exemplary network communications environment 10 that includes the first network node 12 (referred to as the "first client network node"), the second network node 14 (referred to as the "second client network node"), and a virtual environment creator 16 that are interconnected by a network 18. The first client network node 12 and the second client network node 14 are configured as described above in connection with FIG. 1. The virtual environment creator 16 includes at least one server network node 28 that provides a network infrastructure service environment 30. The communications application 26 and the network infrastructure service environment 30 together provide a platform (referred to herein as "the platform") for creating a spatial virtual communication environment (also referred to herein simply as a "virtual environment").

In some embodiments, the network infrastructure service environment 30 manages sessions of the first and second client nodes 12, 14 in a virtual area 32 in accordance with a virtual area application 34. The virtual area application 34 is hosted by the virtual area 32 and includes a description of the virtual area 32. The communications applications 26 operating on the first and second client network nodes 12, 14 present respective views of the virtual area 32 in accordance with data received from the network infrastructure service environment 30 and provide respective interfaces for receiving commands from the communicants. The communicants typically are represented in the virtual area 32 by respective avatars, which move about the virtual area 32 in response to commands that are input by the communicants at their respective network nodes. Each communicants view of the virtual area 32 typically is presented from the perspective of the communicants avatar, which increases the level of immersion experienced by the communicant. Each communicant typically is able to view any part of the virtual area 32 around his or her avatar. In some embodiments, the communications applications 26 establish realtime data stream connections between the first and second client network nodes 12, 14 and other network nodes sharing the virtual area 32 based on the positions of the communicants' avatars in the virtual area 32.

The network infrastructure service environment 30 also maintains a relationship database 36 that contains records 38 of interactions between communicants. Each interaction record 38 describes the context of an interaction between a pair of communicants.

2. Network Environment

The network 18 may include any of a local area network (LAN), a metropolitan area network (MAN), and a wide area network (WAN) (e.g., the internet). The network 18 typically includes a number of different computing platforms and transport facilities that support the transmission of a wide variety of different media types (e.g., text, voice, audio, and video) between network nodes.

The communications application 26 (see FIG. 13) typically operates on a client network node that includes software and hardware resources which, together with administrative policies, user preferences (including preferences regarding the exportation of the user's presence and the connection of the user to areas and other users), and other settings, define a local configuration that influences the administration of realtime connections with other network nodes. The network connections between network nodes may be arranged in a variety of different stream handling topologies, including a peer-to-peer architecture, a server-mediated architecture, and hybrid architectures that combine aspects of peer-to-peer and server-mediated architectures. Exemplary topologies of these types are described in U.S. application Ser. Nos. 11/923,629 and 11/923,634, both of which were filed on Oct. 24, 2007.

3. Network Infrastructure Services

The network infrastructure service environment 30 typically includes one or more network infrastructure services that cooperate with the communications applications 26 in the process of establishing and administering network connections between the client nodes 12, 14 and other network nodes (see FIG. 13). The network infrastructure services may run on a single network node or may be distributed across multiple network nodes. The network infrastructure services typically run on one or more dedicated network nodes (e.g., a server computer or a network device that performs one or more edge services, such as routing and switching). In some embodiments, however, one or more of the network infrastructure services run on at least one of the communicants' network nodes. Among the network infrastructure services that are included in the exemplary embodiment of the network infrastructure service environment 30 are an account service, a security service, an area service, a rendezvous service, and an interaction service.

Account Service

The account service manages communicant accounts for the virtual environment. The account service also manages the creation and issuance of authentication tokens that can be used by client network nodes to authenticate themselves to any of the network infrastructure services.

Security Service

The security service controls communicants' access to the assets and other resources of the virtual environment. The access control method implemented by the security service typically is based on one or more of capabilities (where access is granted to entities having proper capabilities or permissions) and an access control list (where access is granted to entities having identities that are on the list). After a particular communicant has been granted access to a resource, that communicant typically uses the functionality provided by the other network infrastructure services to interact in the network communications environment 10.

Area Service

The area service administers virtual areas. In some embodiments, the area service remotely configures the communications applications 26 operating on the first and second client network nodes 12, 14 in accordance with the virtual area application 34 subject to a set of constraints 47 (see FIG. 13). The constraints 47 typically include controls on access to the virtual area. The access controls typically are based on one or more of capabilities (where access is granted to communicants or client nodes having proper capabilities or permissions) and an access control list (where access is granted to communicants or client nodes having identities that are on the list).

The area service also manages network connections that are associated with the virtual area subject to the capabilities of the requesting entities, maintains global state information for the virtual area, and serves as a data server for the client network nodes participating in a shared communication session in a context defined by the virtual area 32. The global state information includes a list of all the objects that are in the virtual area and their respective locations in the virtual area. The area service sends instructions that configure the client network nodes. The area service also registers and transmits initialization information to other client network nodes that request to join the communication session. In this process, the area service may transmit to each joining client network node a list of components (e.g., plugins) that are needed to render the virtual area 32 on the client network node in accordance with the virtual area application 34. The area service also ensures that the client network nodes can synchronize to a global state if a communications fault occurs. The area service typically manages communicant interactions with virtual areas via governance rules that are associated with the virtual areas.

Rendezvous Service

The rendezvous service manages the collection, storage, and distribution of presence information and provides mechanisms for network nodes to communicate with one another (e.g., by managing the distribution of connection handles) subject to the capabilities of the requesting entities. The rendezvous service typically stores the presence information in a presence database. The rendezvous service typically manages communicant interactions with each other via communicant privacy preferences.

Interaction Service

The interaction service maintains the relationship database 36 that contains the records 38 of interactions between communicants. For every interaction between communicants, one or more services of the network infrastructure service environment 30 (e.g., the area service) transmit interaction data to the interaction service. In response, the interaction service generates one or more respective interaction records and stores them in the relationship database. Each interaction record describes the context of an interaction between a pair of communicants. For example, in some embodiments, an interaction record contains an identifier for each of the communicants, an identifier for the place of interaction (e.g., a virtual area instance), a description of the hierarchy of the interaction place (e.g., a description of how the interaction room relates to a larger area), start and end times of the interaction, and a list of all files and other data streams that are shared or recorded during the interaction. Thus, for each realtime interaction, the interaction service tracks when it occurred, where it occurred, and what happened during the interaction in terms of communicants involved (e.g., entering and exiting), objects that are activated/deactivated, and the files that were shared.

The interaction service also supports queries on the relationship database 36 subject to the capabilities of the requesting entities. The interaction service presents the results of queries on the interaction database records in a sorted order (e.g., most frequent or most recent) based on virtual area. The query results can be used to drive a frequency sort of contacts whom a communicant has met in which virtual areas, as well as sorts of who the communicant has met with regardless of virtual area and sorts of the virtual areas the communicant frequents most often. The query results also may be used by application developers as part of a heuristic system that automates certain tasks based on relationships. An example of a heuristic of this type is a heuristic that permits communicants who have visited a particular virtual area more than five times to enter without knocking by default or a heuristic that allows communicants who were present in an area at a particular time to modify and delete files created by another communicant who was present in the same area at the same time. Queries on the relationship database 36 can be combined with other searches. For example, queries on the relationship database may be combined with queries on contact history data generated for interactions with contacts using a communication system (e.g., Skype, Facebook, and Flickr) that is outside the domain of the network infrastructure service environment 30.

4. Virtual Areas

The communications application 26 and the network infrastructure service environment 30 typically administer the realtime connections with network nodes in a communication context that is defined by an instance of a virtual area. The virtual area instance may correspond to an abstract (non-geometric) virtual space that is defined with respect to abstract coordinates. Alternatively, the virtual area instance may correspond to a visual virtual space that is defined with respect to one-, two- or three-dimensional geometric coordinates that are associated with a particular visualization. Abstract virtual areas may or may not be associated with respective visualizations, whereas visual virtual areas are associated with respective visualizations.

As explained above, communicants typically are represented by respective avatars in a virtual area that has an associated visualization. The avatars move about the virtual area in response to commands that are input by the communicants at their respective network nodes. In some embodiments, the communicants view of a virtual area instance typically is presented from the perspective of the communicants avatar, and each communicant typically is able to view any part of the visual virtual area around his or her avatar, increasing the level of immersion that is experienced by the communicant.

Figure 17:
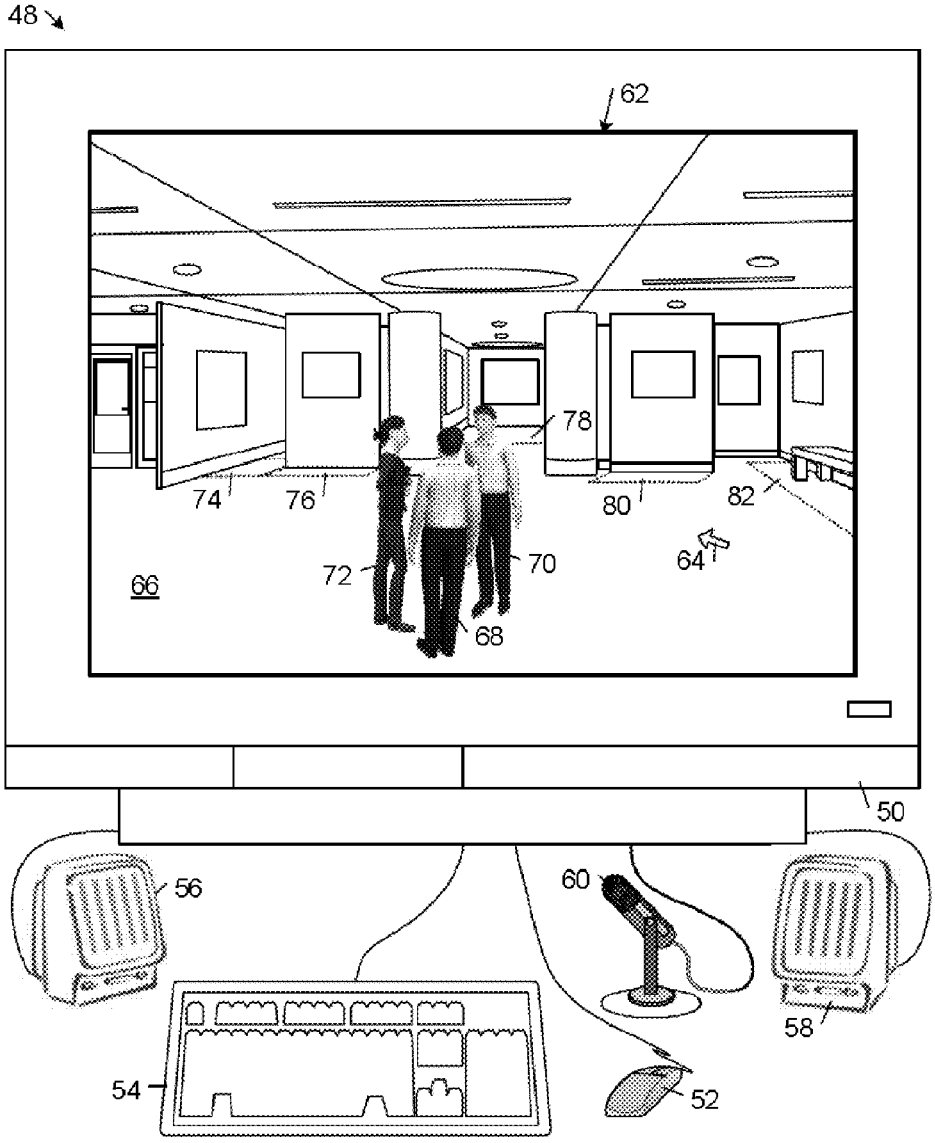
FIG. 17 is a diagrammatic view of an embodiment of a network node that includes a graphical user interface presenting a depiction of a virtual area.

FIG. 17 shows an embodiment of an exemplary network node that is implemented by a computer system 48. The computer system 48 includes a display monitor 50, a computer mouse 52, a keyboard 54, speakers 56, 58, and a microphone 60. The display monitor 50 displays a graphical user interface 62. The graphical user interface 62 is a windows-based graphical user interface that can include multiple windows, icons, and a pointer 64. In the illustrated embodiment, the graphical user interface 62 presents a two-dimensional depiction of a shared virtual area 66 that is associated with a three-dimensional visualization representing an art gallery. Communicants are represented in the virtual area 66 by respective avatars 68, 70, 72, each of which may have a respective role (e.g., a curator, an artist, and a visitor) in the context of the virtual area 66.

As explained in detail below, the virtual area 66 includes zones 74, 76, 78, 80, 82 that are associated with respective rules that govern the switching of realtime data streams between the network nodes that are represented by the avatars 68-72 in the virtual area 66. (During a typical communication session, the dashed lines demarcating the zones 74-82 in FIG. 16 are not visible to the communicants although there may be visual cues associated with such zone boundaries.) The switching rules dictate how local connection processes executing on each of the network nodes establishes communications with the other network nodes based on the locations of the communicants' avatars 68-72 in the zones 74-82 of the virtual area 66.

A virtual area is defined by a specification that includes a description of geometric elements of the virtual area and one or more rules, including switching rules and governance rules. The switching rules govern realtime stream connections between the network nodes. The governance rules control a communicants access to resources, such as the virtual area itself, regions with the virtual area, and objects within the virtual area. In some embodiments, the geometric elements of the virtual area are described in accordance with the COLLADA-Digital Asset Schema Release 1.4.1 April 2006 specification (available from http://www.khronos.org/collada/), and the switching rules are described using an extensible markup language (XML) text format (referred to herein as a virtual space description format (VSDL)) in accordance with the COLLADA Streams Reference specification described in U.S. application Ser. Nos. 11/923,629 and 11/923,634.

The geometric elements of the virtual area typically include physical geometry and collision geometry of the virtual area. The physical geometry describes the shape of the virtual area. The physical geometry typically is formed from surfaces of triangles, quadrilaterals, or polygons. Colors and textures are mapped onto the physical geometry to create a more realistic appearance for the virtual area. Lighting effects may be provided, for example, by painting lights onto the visual geometry and modifying the texture, color, or intensity near the lights. The collision geometry describes invisible surfaces that determine the ways in which objects can move in the virtual area. The collision geometry may coincide with the visual geometry, correspond to a simpler approximation of the visual geometry, or relate to application-specific requirements of a virtual area designer.

The switching rules typically include a description of conditions for connecting sources and sinks of realtime data streams in terms of positions in the virtual area. Each rule typically includes attributes that define the realtime data stream type to which the rule applies and the location or locations in the virtual area where the rule applies. In some embodiments, each of the rules optionally may include one or more attributes that specify a required role of the source, a required role of the sink, a priority level of the stream, and a requested stream handling topology. In some embodiments, if there are no explicit switching rules defined for a particular part of the virtual area, one or more implicit or default switching rules may apply to that part of the virtual area. One exemplary default switching rule is a rule that connects every source to every compatible sink within an area, subject to policy rules. Policy rules may apply globally to all connections between the client nodes or only to respective connections with individual client nodes. An example of a policy rule is a proximity policy rule that only allows connections of sources with compatible sinks that are associated with respective objects that are within a prescribed distance (or radius) of each other in the virtual area.

In some embodiments, governance rules are associated with a virtual area to control who has access to the virtual area, who has access to its contents, what is the scope of that access to the contents of the virtual area (e.g., what can a user do with the contents), and what are the follow-on consequences of accessing those contents (e.g., record keeping, such as audit logs, and payment requirements). In some embodiments, an entire virtual area or a zone of the virtual area is associated with a "governance mesh." In some embodiments, a governance mesh is implemented in a way that is analogous to the implementation of the zone mesh described in U.S. application Ser. Nos. 11/923,629 and 11/923,634. A governance mesh enables a software application developer to associate governance rules with a virtual area or a zone of a virtual area. This avoids the need for the creation of individual permissions for every file in a virtual area and avoids the need to deal with the complexity that potentially could arise when there is a need to treat the same document differently depending on the context.

In some embodiments, a virtual area is associated with a governance mesh that associates one or more zones of the virtual area with a digital rights management (DRM) function. The DRM function controls access to one or more of the virtual area or one or more zones within the virtual area or objects within the virtual area. The DRM function is triggered every time a communicant crosses a governance mesh boundary within the virtual area. The DRM function determines whether the triggering action is permitted and, if so, what is the scope of the permitted action, whether payment is needed, and whether audit records need to be generated. In an exemplary implementation of a virtual area, the associated governance mesh is configured such that if a communicant is able to enter the virtual area he or she is able to perform actions on all the documents that are associated with the virtual area, including manipulating the documents, viewing the documents, downloading the documents, deleting the documents, modifying the documents and re-uploading the documents. In this way, the virtual area can become a repository for information that was shared and discussed in the context defined by the virtual area.

Additional details regarding the specification of a virtual area are described in U.S. application Ser. No. 61/042,714 (which was filed on Apr. 4, 2008), Ser. No. 11/923,629 (which was filed on Oct. 24, 2007), and Ser. No. 11/923,634 (which was filed on Oct. 24, 2007).

5. Communications Application

In some embodiments, the communications application 26 includes:

a. local Human Interface Devices (HIDs) and audio playback devices;

b. a So3D graphical display, avatar, and physics engine;

c. a system database and storage facility.

a. Local Human Interface Devices (HIDS) and Audio Playback Devices

The local HIDs enable a communicant to input commands and other signals into the client network node while participating in a virtual area communications session. Exemplary HIDs include a computer keyboard, a computer mouse, a touch screen display, and a microphone.

The audio playback devices enable a communicant to playback audio signals that are received during a virtual area communications session. Exemplary audio playback devices include audio processing hardware (e.g., a sound card) for manipulating (e.g., mixing and applying special effects) audio signals, and speakers for outputting sounds.

b. So3D Graphical Display, Avatar, and Physics Engine

The So3D engine is a three-dimensional visualization engine that controls the presentation of a respective view of a virtual area and objects in the virtual area on a display monitor. The So3D engine typically interfaces with a graphical user interface driver and the HID devices to present the views of the virtual area and to allow the communicant to control the operation of the communications application 26.

In some embodiments, the So3D engine receives graphics rendering instructions from the area service. The So3D engine also may read a local communicant avatar database that contains images needed for rendering the communicants avatar in the virtual area. Based on this information, the So3D engine generates a visual representation (i.e., an image) of the virtual area and the objects in the virtual area from the point of view (position and orientation) of the communicants avatar in the virtual area. The visual representation typically is passed to the graphics rendering components of the operating system, which drive the graphics rendering hardware to render the visual representation of the virtual area on the client network node.

The communicant can control the presented view of the virtual area by inputting view control commands via a HID device (e.g., a computer mouse). The So3D engine updates the view of the virtual area in accordance with the view control commands. The So3D engine also updates the graphic representation of the virtual area on the display monitor in accordance with updated object position information received from the area service 26.

c. System Database and Storage Facility

The system database and storage facility stores various kinds of information that is used by the platform. Exemplary information that typically is stored by the storage facility includes the presence database, the relationship database, an avatar database, a real user id (RUID) database, an art cache database, and an area application database. This information may be stored on a single network node or it may be distributed across multiple network nodes.

6. Client Node Architecture

A communicant typically connects to the network 18 from a client network node. The client network node typically is implemented by a general-purpose computer system or a dedicated communications computer system (or "console", such as a network-enabled video game console). The client network node executes communications processes that establish realtime data stream connections with other network nodes and typically executes visualization rendering processes that present a view of each virtual area entered by the communicant.

Figure 18:
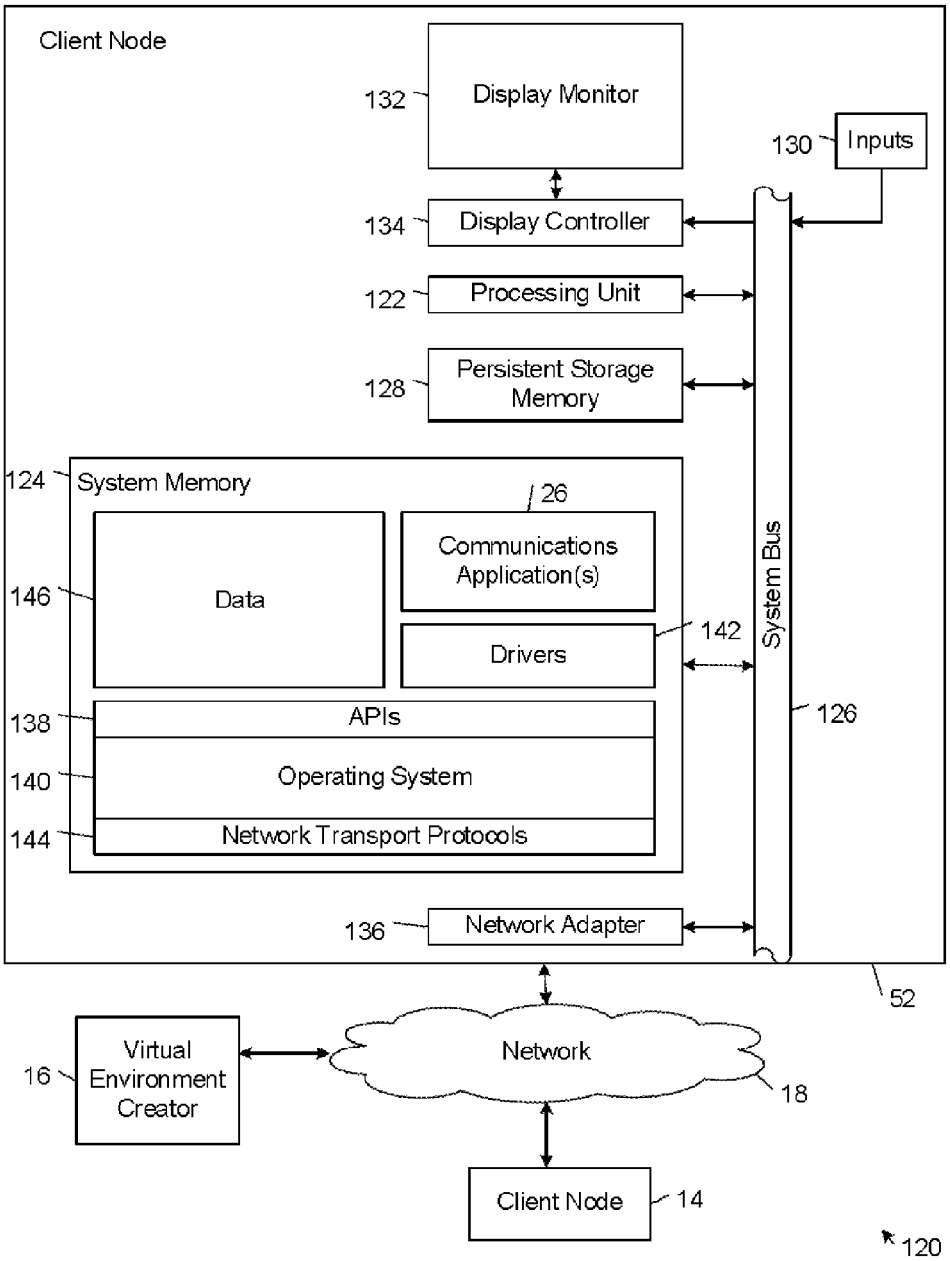
FIG. 18 is a block diagram of the network communication environment of FIG. 16 that shows components of an embodiment of a client network node.

FIG. 18 shows an embodiment of a client network node that is implemented by a computer system 120. The computer system 120 includes a processing unit 122, a system memory 124, and a system bus 126 that couples the processing unit 122 to the various components of the computer system 120. The processing unit 122 may include one or more data processors, each of which may be in the form of any one of various commercially available computer processors. The system memory 124 includes one or more computer-readable media that typically are associated with a software application addressing space that defines the addresses that are available to software applications. The system memory 124 may include a read only memory (ROM) that stores a basic input/output system (BIOS) that contains start-up routines for the computer system 120, and a random access memory (RAM). The system bus 126 may be a memory bus, a peripheral bus or a local bus, and may be compatible with any of a variety of bus protocols, including PCI, VESA, Microchannel, ISA, and EISA. The computer system 120 also includes a persistent storage memory 128 (e.g., a hard drive, a floppy drive, a CD ROM drive, magnetic tape drives, flash memory devices, and digital video disks) that is connected to the system bus 126 and contains one or more computer-readable media disks that provide non-volatile or persistent storage for data, data structures and computer-executable instructions.

A communicant may interact (e.g., input commands or data) with the computer system 120 using one or more input devices 130 (e.g. one or more keyboards, computer mice, microphones, cameras, joysticks, physical motion sensors such Wii input devices, and touch pads). Information may be presented through a graphical user interface (GUI) that is presented to the communicant on a display monitor 132, which is controlled by a display controller 134. The computer system 120 also may include other input/output hardware (e.g., peripheral output devices, such as speakers and a printer). The computer system 120 connects to other network nodes through a network adapter 136 (also referred to as a "network interface card" or NIC).

A number of program modules may be stored in the system memory 124, including application programming interfaces 138 (APIs), an operating system (OS) 140 (e.g., the Windows XP® operating system available from Microsoft Corporation of Redmond, Wash. U.S.A.), the communications application 26, drivers 142 (e.g., a GUI driver), network transport protocols 144, and data 146 (e.g., input data, output data, program data, a registry, and configuration settings).

7. Server Node Architecture

In some embodiments, the one or more server network nodes of the virtual environment creator 16 are implemented by respective general-purpose computer systems of the same type as the client network node 120, except that each server network node typically includes one or more server software applications.

In other embodiments, the one or more server network nodes of the virtual environment creator 16 are implemented by respective network devices that perform edge services (e.g., routing and switching).

B. Exemplary Communication Session

Referring back to FIG. 17, during a communication session, each of the client network nodes generates a respective set of realtime data streams (e.g., motion data streams, audio data streams, chat data streams, file transfer data streams, and video data streams). For example, each communicant manipulates one or more input devices (e.g., the computer mouse 52 and the keyboard 54) that generate motion data streams, which control the movement of his or her avatar in the virtual area 66. In addition, the communicants voice and other sounds that are generated locally in the vicinity of the computer system 48 are captured by the microphone 60. The microphone 60 generates audio signals that are converted into realtime audio streams. Respective copies of the audio streams are transmitted to the other network nodes that are represented by avatars in the virtual area 66. The sounds that are generated locally at these other network nodes are converted into real-time audio signals and transmitted to the computer system 48. The computer system 48 converts the audio streams generated by the other network nodes into audio signals that are rendered by the speakers 56, 58. The motion data streams and audio streams may be transmitted from each of the communicant nodes to the other client network nodes either directly or indirectly. In some stream handling topologies, each of the client network nodes receives copies of the realtime data streams that are transmitted by the other client network nodes. In other stream handling topologies, one or more of the client network nodes receives one or more stream mixes that are derived from realtime data streams that are sourced (or originated) from other ones of the network nodes.

In some embodiments, the area service maintains global state information that includes a current specification of the virtual area, a current register of the objects that are in the virtual area, and a list of any stream mixes that currently are being generated by the network node hosting the area service. The objects register typically includes for each object in the virtual area a respective object identifier (e.g., a label that uniquely identifies the object), a connection handle (e.g., a URI, such as an IP address) that enables a network connection to be established with a network node that is associated with the object, and interface data that identifies the realtime data sources and sinks that are associated with the object (e.g., the sources and sinks of the network node that is associated with the object). The objects register also typically includes one or more optional role identifiers for each object; the role identifiers may be assigned explicitly to the objects by either the communicants or the area service, or may be inferred from other attributes of the objects or the user. In some embodiments, the objects register also includes the current position of each of the objects in the virtual area as determined by the area service from an analysis of the realtime motion data streams received from the network nodes associated with objects in the virtual area. In this regard, the area service receives realtime motion data streams from the network nodes associated with objects in the virtual area, tracks the communicants' avatars and other objects that enter, leave, and move around in the virtual area based on the motion data. The area service updates the objects register in accordance with the current locations of the tracked objects.

In the process of administering realtime data stream connections with other network nodes, the area service maintains for each of the client network nodes a set of configuration data, including interface data, a zone list and the positions of the objects that currently are in the virtual area. The interface data includes for each object associated with each of the client network nodes a respective list of all the sources and sinks of realtime data stream types that are associated with the object. The zone list is a register of all the zones in the virtual area that currently are occupied by the avatar associated with the corresponding client network node. When a communicant first enters a virtual area, the area service typically initializes the current object positions database with position initialization information. Thereafter, the area service updates the current object positions database with the current positions of the objects in the virtual area as determined from an analysis of the realtime motion data streams received from the other client network nodes sharing the virtual area.

C. Interfacing with a Spatial Virtual Communication Environment

In addition to the local Human Interface Device (HID) and audio playback devices, the So3D graphical display, avatar, and physics engine, and the system database and storage facility, the communications application 26 also includes a graphical navigation and interaction interface (referred to herein as a "seeker interface") that interfaces the user with the spatial virtual communication environment. The seeker interface includes navigation controls that enable the user to navigate the virtual environment and interaction controls that enable the user to control his or her interactions with other communicants in the virtual communication environment. The navigation and interaction controls typically are responsive to user selections that are made using any type of input device, including a computer mouse, a touch pad, a touch screen display, a keyboard, and a video game controller. The seeker interface is an application that operates on each client network node. The seeker interface is a small, lightweight interface that a user can keep up and running all the time on his or her desktop. The seeker interface allows the user to launch virtual area applications and provides the user with immediate access to realtime contacts and realtime collaborative places (or areas). The seeker interface is integrated with realtime communications applications and/or realtime communications components of the underlying operating system such that the seeker interface can initiate and receive realtime communications with other network nodes. A virtual area is integrated with the users desktop through the seeker interface such that the user can upload files into the virtual environment created by the virtual environment creator 16, use files stored in association with the virtual area using the native client software applications independently of the virtual environment while still present in a virtual area, and more generally treat presence and position within a virtual area as an aspect of their operating environment analogous to other operating system functions rather than just one of several applications.

The spatial virtual communication environment typically can be modeled as a spatial hierarchy of places (also referred to herein as "locations") and objects. The spatial hierarchy includes an ordered sequence of levels ranging from a top level to a bottom level. Each of the places in a successive one of the levels of the spatial hierarchy is contained in a respective one of the places in a preceding one of the levels. Each of the objects in the spatial hierarchy is contained in a respective one of the places. The levels of the spatial hierarchy typically are associated with respective visualizations that are consistent with a geographical, architectural, or urban metaphor, and are labeled accordingly. The zones of each virtual area are defined by respective meshes, some of which define elements of a physical environment (e.g., spaces, such as rooms and courtyards, that are associated with a building) that may contain objects (e.g., avatars and props, such as view screen objects and conferencing objects).

The navigational controls of the seeker interface allow the user to traverse a path through the virtual environment in accordance with a navigational model that is tied to the underlying spatial hierarchy of places and objects. The network infrastructure service environment 30 records the path traversed by the user. In some embodiments, the network infrastructure service environment 30 records a history that includes a temporally ordered list of views of the virtual area that are presented to the user as the user navigates through the virtual area. Each view typically corresponds to a view of a respective renderable zone of the virtual area. In these embodiments, the navigation controls enable the user to move to selected ones of the zones in the history. The navigation controls also include a graphical representation of a depth path that shows the location in the spatial hierarchy that corresponds to the users current view of the virtual area. In some embodiments, the graphical representation of the depth path includes a respective user-selectable link to a respective view of each of the preceding levels in the spatial hierarchical model of the virtual area above the current view.

The interaction controls of the seeker interface allow the user to manage interactions with other communicants. The interaction options that available to the user typically depend on the zones in which the user has a presence. In some embodiments, the interaction options that are available to communicants who have presence in a particular zone are different from the options that are available to other communicants who do not have presence in that zone. The level of detail and interactivity of the user typically depend on whether or not the user has a presence the particular zone. In one exemplary embodiment, if the user is outside the virtual area, the user is provided with a minimal level of detail of the interactions occurring within the virtual area (e.g., the user can see an outline of the floorplan, background textures, and plants of the area, but the user cannot see where other communicants are present in the area); if the user is within the virtual area but outside a particular zone of the area, the user is provided with a medium level of detail of the interactions occurring within the particular zone (e.g., the user can see where other communicants are present in the area, see a visualization of their current states—talking, typing a chat message, whether or not their headphones and microphones are turned-on—and see whether any of the view screens are active); if the user is within the particular zone of the area, the user is provided with full level of detail of the interactions occurring with the particular zone (e.g., the user can see a thumbnail of the file being shared on a view screen, hear and speak with other communicants in the area, and see elements of a log of chat messages that were generated by communicants in the zone). In some embodiments, the switching and governance rules that are associated with the zones of the virtual area control how the network infrastructure services distinguish between those who have presence in the particular zone from those who do not.

Figure 19:
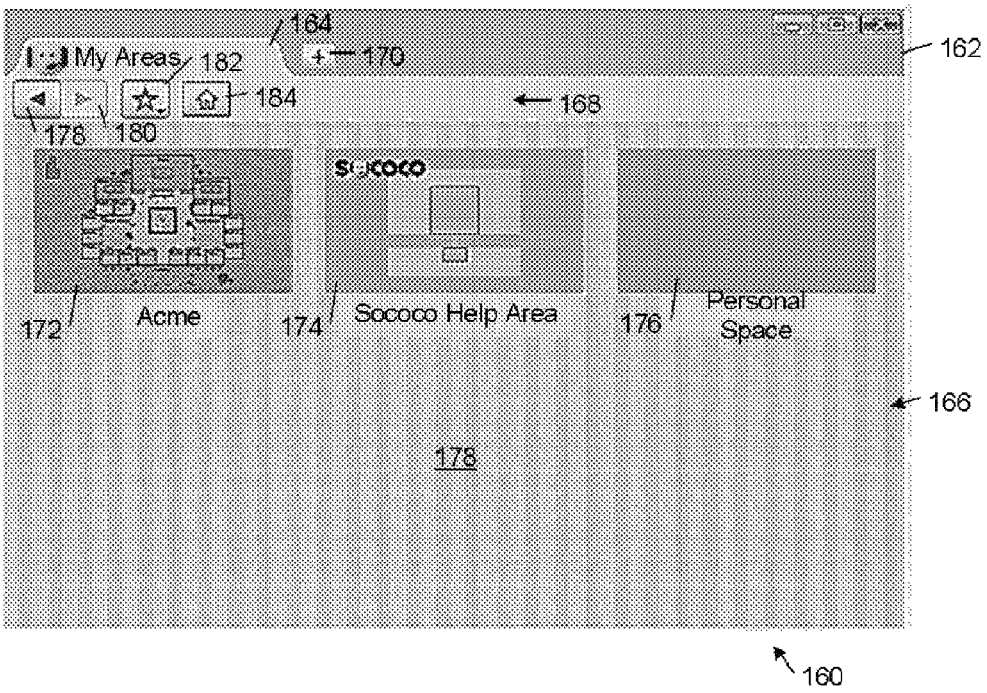
FIG. 19 is a diagrammatic view of an embodiment of a graphical user interface.

FIG. 19 shows an embodiment 160 of the seeker interface that is displayed in a window 162 and includes one or more tabs 164, each of which has a browsing area 166 and a toolbar 168.

Each of the tabs 164 typically is associated with a respective view of the virtual environment. In the illustrated embodiment the view presented in the table 164 (labeled "My Areas") is associated with a respective set of virtual areas, which may be a default set of virtual areas in the virtual environment or it may be a set of virtual areas that is identified by a respective filter on the interaction database. In particular, the tab 164 is associated with a set of three virtual areas (i.e., Acme, Sococo Help Area, and Personal Space), which may be a default set of areas that are associated with the user or may be identified by a filter that identifies all of the areas that are associated with the user (e.g., all of the areas in which the user has interacted). Additional tabs may be created by selecting the "+" button 170.

The browsing area 166 of each tab shows graphic representations of the elements of the virtual environment that are associated with the tab. For example, in the illustrated embodiment, the browsing area 166 shows top-level views 172, 174, 176 of the virtual areas that are associated with the tab 164. The user may navigate to the next lower level in the spatial hierarchical model of any of the virtual areas by selecting the corresponding graphic representation of the virtual area.

The toolbar 168 includes an adaptive set of navigational and interaction tools that automatically are selected by the seeker interface based on the current location of the user in the virtual environment In the illustrated embodiment, the toolbar 168 includes a back button 178, a forward button 180, a placemarks button 182, and a home button 184. The back button 178 corresponds to a backward control that enables the user to incrementally move backward to preceding ones of the zones in the history of the zones that were traversed by the user. The forward button 180 corresponds to a forward control that enables the user to incrementally move forward to successive ones of the zones in the history of the zones that were traversed by the user. The placemarks button 182 provides a placemarking control for storing links to zones and a placemark navigation control for viewing a list of links to previously placemarked zones. In response to a user selection of the placemarking control, a placemark is created by storing an image of the location shown in the current view in association with a hyperlink to the corresponding location in the virtual area. In response to a user selection of the placemark navigation control, a placemarks window is presented to the user. The placemarks window includes live visualizations of all locations that have been placemarked by the user. Each of the images in the placemarks window is associated with a respective user-selectable hyperlink. In response to user selection of one of the hyperlinks in the placemarks window, a view of the virtual area corresponding to the location associated with the selected hyperlink is automatically displayed in the browsing area 166 of the seeker interface window 162. The home button 184 corresponds to a control that returns the user to a view of a designated "home" location in the virtual environment (e.g., the view shown in FIG. 19).

Figure 20:
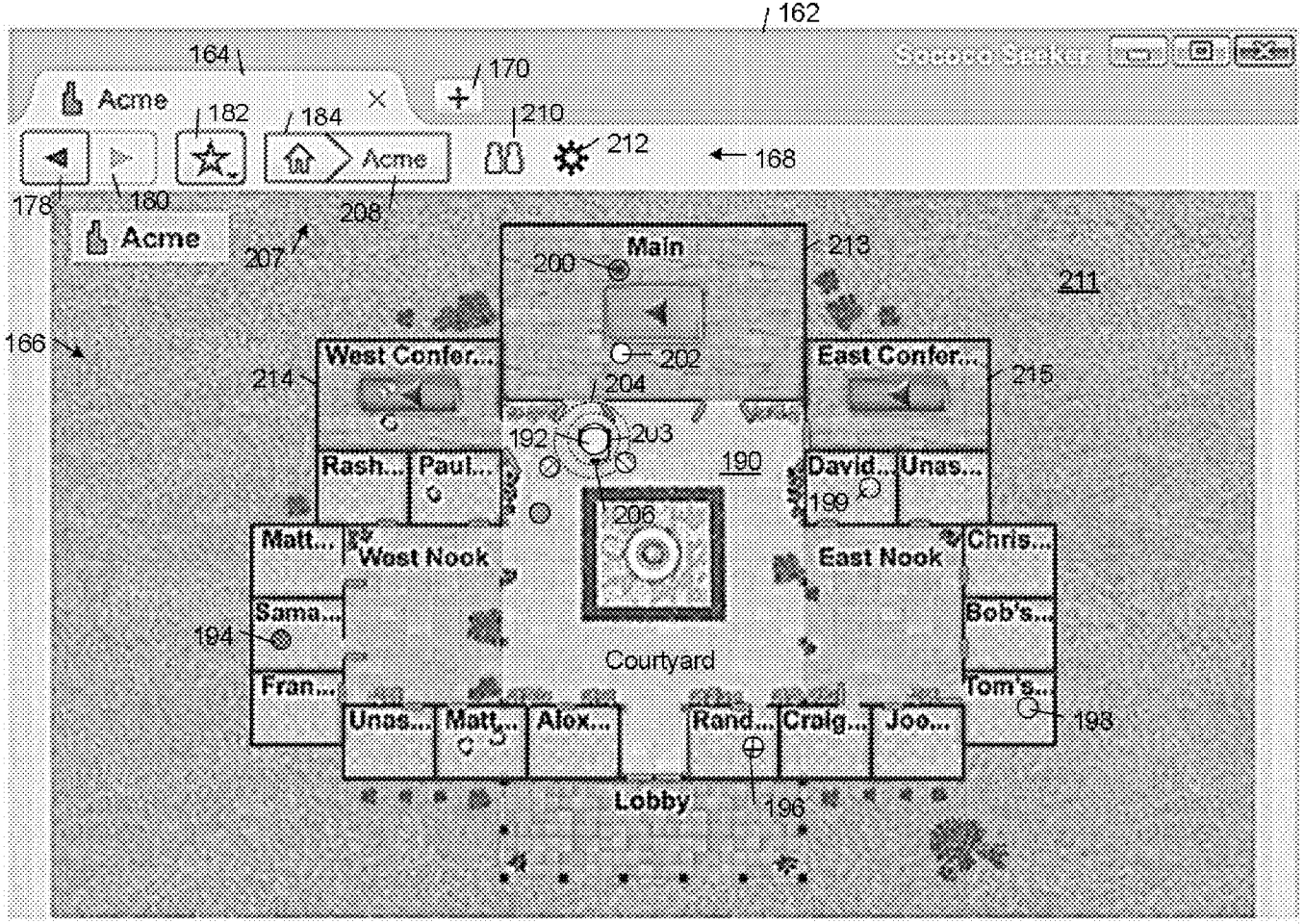
FIG. 20 is a diagrammatic view of an embodiment of a graphical user interface.

Referring to FIG. 20, in response to a user selection of the graphic representation 172 of the Acme virtual area shown in FIG. 19, the platform moves the user into a default zone of the virtual area, automatically establishes a presence for the user in the default zone, and automatically establishes a network connection between the user and each of the other communicants occupying the selected zone. Based on the switching rules established by the area designer, the platform multiplexes the specified realtime data streams (e.g., streams from the microphones and speakers) of all the communicants in default zone such that they can both see each others' sprites or avatars and communicate with (e.g., speak to and hear) each other.

The seeker interface shows a top or floorplan view of the Acme virtual area in the browsing area 166 of the tab 164 and provides the user with a default set of interaction options. In the illustrated embodiment, a presence automatically is established in a courtyard zone 190 of the virtual area, and the user's microphone and default speakers (e.g., headphones) are turned-on. In the floorplan view shown in FIG. 20, the user is represented by a circular sprite 192; the other users in the Acme virtual area also are represented by respective circular sprites 194-202. The state of the user's speakers is depicted by the presence or absence of a headphones graphic 203 on the user's sprite 192: when the speakers are on, the headphones graphic 203 is present and, when the speakers are off, the headphones graphic 203 is absent. The state of the user's microphone is depicted by the presence or absence of a microphone graphic 206 on the user's sprite 192 and a series of concentric circles 204 around the user's sprite 192: when the microphone is on, the microphone graphic 206 and the concentric circles 204 are present and, when the microphone is off, the microphone graphic 206 and the concentric circles 204 are absent The headphones graphic 203, the concentric circles 204, and the microphone graphic 206 serve as visual reminders of the states of the users sound playback and microphone devices.

In addition to the backward button 178, the forward button 180, the placemarks button 182, and the home button 184, the toolbar 168 also includes a series of one or more breadcrumb buttons 207 that originate from and include the home button 184. The breadcrumb buttons 207 correspond to a hierarchical sequence of successive, user-selectable links. Each of the successive links corresponds to a view of a respective level in the hierarchical model of the virtual area in which each successive level is contained by preceding ones of the levels. In the illustrated embodiment, the breadcrumb buttons 207 include the home button 184 and an Acme button 208 that corresponds to the current view of the Acme virtual area shown in FIG. 20. The breadcrumb buttons 207 provide the user with single button selection access to respective views of different levels of the virtual environment. The toolbar 168 additionally includes a button 210 and a settings button 212.

When an area is selected or in focus, the button 210 appears as an iconographic representation of two people and is labeled "members," and allows members and moderators to see the list of people associated with an area. When an audio or chat zone is in focus, the button 210 has a different image (e.g., an image of an arrow pointing downward onto a plane to represent the operation of getting) and is labeled "get". In response to a user selection of the button 210, a list of all the members of the Acme virtual area 166 is displayed in a user interface. The user may select any of the communicants in the list and click a get button that is presented in the user interface; in response, the platform transmits an invitation to the selected communicant to join the user in a designated one of the zones.

The settings button 212 provides the user with access to a set of controls for specifying default settings that are associated with the current area.

The user may navigate from the view of the Acme virtual area shown in FIG. 20 back to the view shown in FIG. 19 in a variety of different ways. For example, the user may select any of the back button 178, the home button 184, or any part of the zone 211 that is outside the boundary of the graphic representation of the Acme virtual area shown in FIG. 20.

The user may navigate to any of the zones of the Acme virtual area. In some embodiments, in order to move to a zone, the user transmits a command to execute one of the zones displayed on the monitor, (e.g., by selecting the zone and then clicking the Enter button (in the toolbar), or, as a shortcut, double-clicking the zone) and, in response, the platform depicts the user's avatar in the zone corresponding to the zone object. In response to the zone execution command, the seeker interface outlines the zone (indicating to the user that it is selected) and updates the breadcrumb buttons 207 to show the selected zone location in the hierarchy. Toolbar buttons specific to the selection will also appear to the right of the breadcrumb buttons 207.

The user also may interact with any objects (e.g., a screen, table, or file) that are present in a zone. In some embodiments, in order to interact with an object, the user transmits a command to execute one of the objects displayed on the monitor, (e.g., by selecting the object and then clicking the View button (in the toolbar), or, as a shortcut, double-clicking the object) and, in response, the platform performs an operation with respect to the object (e.g., present a zoomed-in view of the object, open an interaction interface window, etc.). In response to the object execution command, the seeker interface outlines or otherwise highlights the prop (indicating to the user that it is selected) and updates the breadcrumb buttons 207 to show the selected object location in the hierarchy. Toolbar buttons specific to the selection will also appear to the right of the breadcrumb buttons 207.

Figure 21:
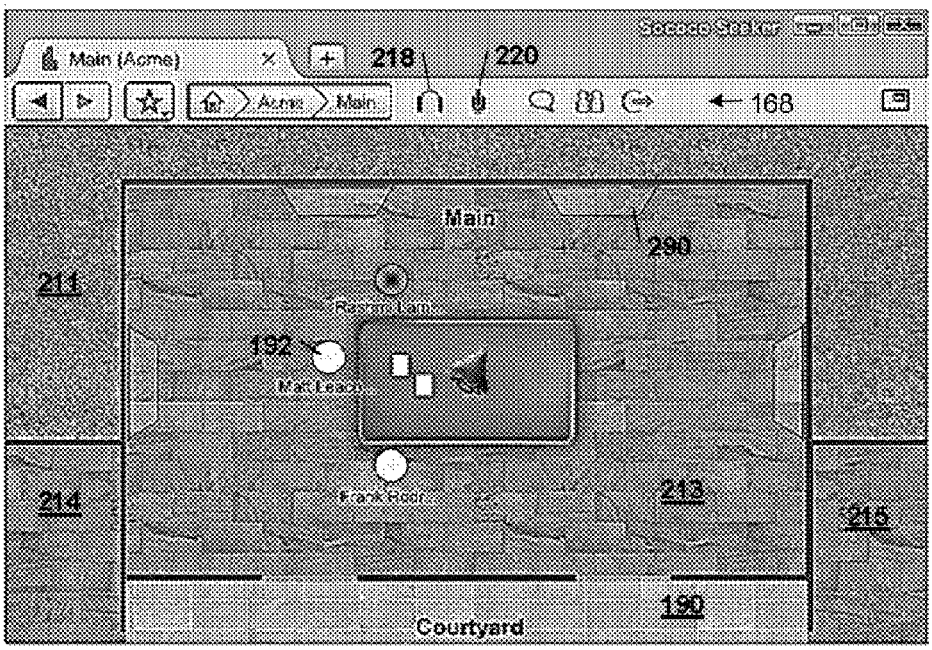
FIG. 21 is a diagrammatic view of an embodiment of a graphical user interface.

Referring to FIG. 21, in some embodiments, in response to the user entering a Main space 213, the platform automatically establishes a network connection between the user and each of the other communicants occupying the selected zone. The user also may enter (and thereby establish a presence in) a space by selecting the space and clicking the Enter button; this causes the platform to move the user's sprite from its current location (i.e., Courtyard) to the selected space (i.e., Main). The settings of user's speakers and microphone typically do not change when the user is moved from one location to another.

Figure 22:
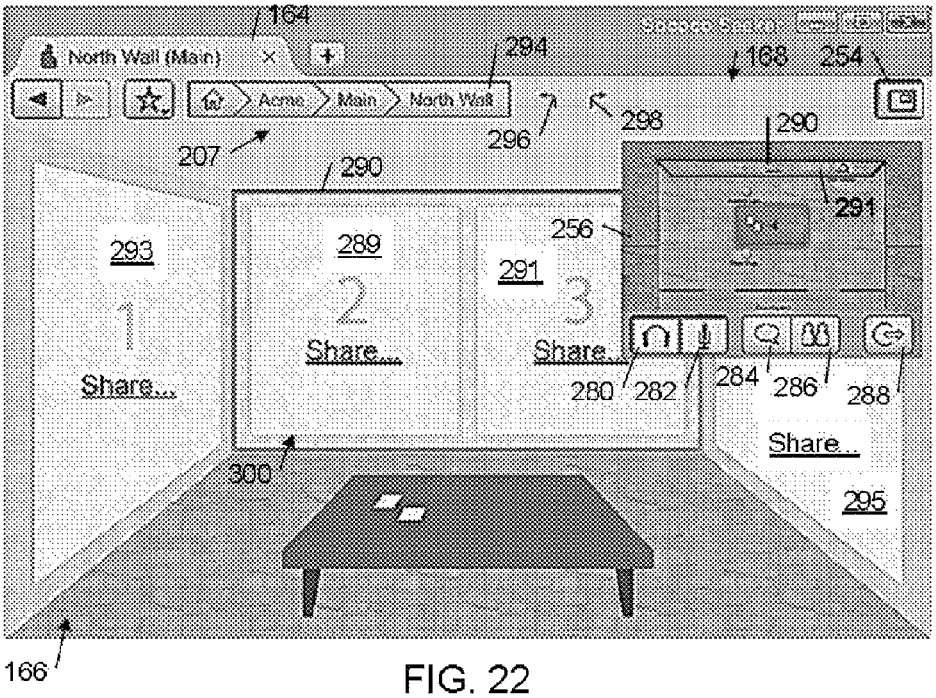
FIG. 22 is a diagrammatic view of an embodiment of a graphical user interface.

FIG. 22 shows a situation in which the user has double-clicked a wall object 290 in the view of the Main space 213 shown in FIG. 21.

In response to the user's command to execute the wall object 290, the seeker interface presents in the browsing area 166 of the tab 164 a 2.5-dimensional view of the contents of the wall object 290 and areas of the Main space 213 surrounding the wall object 290. In the embodiment shown in FIG. 22, the selected wall object 290 corresponds to a North Wall of the Main space 213. The North Wall contains a pair of view screen objects 289, 291 (labeled "2" and "3", respectively) that are presented on the North Wall object 290. The view screen objects 289, 291 can be used to present the contents of data files that are associated with the North Wall of the Main space 213. The 2.5-dimensional view also shows a West Wall object 293 and an East Wall object 295 that are located on the left and right sides of the North Wall object 290, respectively. Each of the West Wall object 293 and the East Wall object 295 includes a respective view screen object 293, 295 (labeled "1" and 4", respectively) that can be used to present the contents of respective data files.

The interface also shows in the minimap 256 a view of the Main space 213 and areas of the Acme space surrounding the Main space 213. The minimap 256 also shows a highlighted view 292 of the selected North Wall object 290 in the Main space 213.

The breadcrumb buttons 207 shown in the toolbar 168 of the tab 164 include a North Wall button 294 that corresponds to the current level in the hierarchical spatial model of the virtual area. The toolbar 168 includes a rotate left button 296 and a rotate right button 298 that allow the user to rotate the current view left and right by ninety degrees (90°) so that the user can view the contents of different walls of the Main space in the central viewing area of the 2.5-dimensional view of the Main space 213. The user also can double-click a different one of the walls that are shown in the minimap 256 in order to change the contents that are presented in the central viewing area of the 2.5-dimensional view of the Main space 213.

Figure 23:
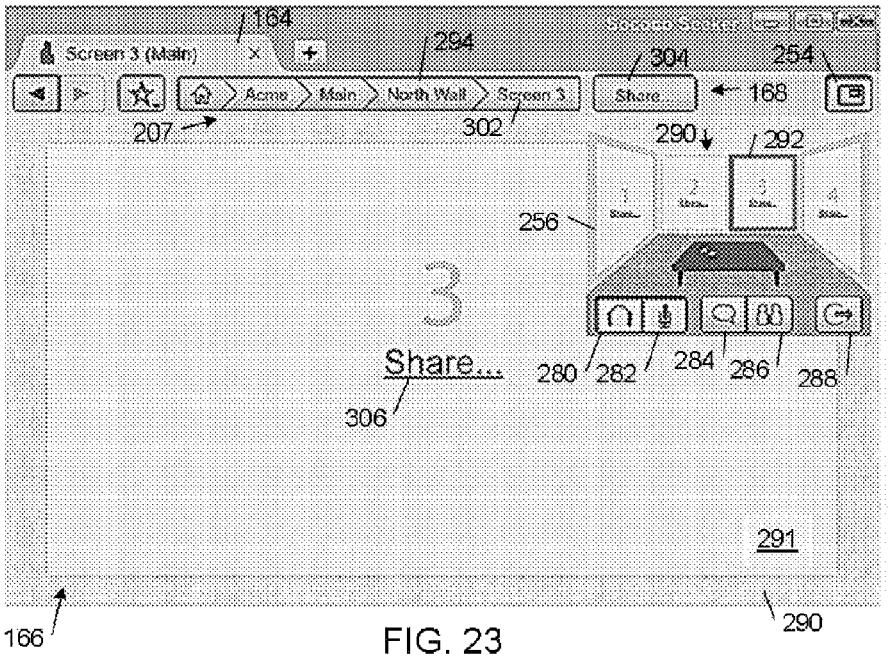
FIG. 23 is a diagrammatic view of an embodiment of a graphical user interface.

FIG. 23 shows the seeker interface after the user has selected the view screen object 291 (labeled "3") on the North Wall in the view of the Main space 213 shown in FIG. 22. The user may have executed the view screen object 291 either by double-clicking any part of the view screen object 291 shown in the central viewing area of the 2.5-dimensional view shown in the browsing area 166 of the tab 164 or by double-clicking the corresponding view screen object in the minimap 256 shown in FIG. 22. In response to the user double-clicking on the view screen object 291 shown in FIG. 22, the browsing area 166 of the tab 164 shows a zoomed-in view of the view screen object 291 and areas of the North Wall object 290 surrounding the view screen object 291, as shown in FIG. 23. The user may double-click on any of the areas of the North Wall object 290 surrounding the view screen object 291 in the browsing area 166 shown in FIG. 22 in order to return to the browsing area and minimap views of the Main space 213 that are shown in FIG. 22. In the embodiment shown in FIG. 23, the minimap 256 shows a 2.5-dimensional view of the contents of the wall object 290 along with areas of the Main space surrounding the wall object 290; this view corresponds to the preceding level in the hierarchical spatial model of the virtual area. The breadcrumb buttons 207 include a Screen 3 button 302 that corresponds to the current level in the hierarchical spatial model of the virtual area. The toolbar 168 includes a Share button 304 that allows a user to designate a shared data file whose contents will be presented on the view screen object 291 (i.e., Screen 3) and thereby allow all communicants in the Main space 213 to simultaneously share the data file. The view screen object 291 shown in the browsing area 166 includes a Share link 306 that also allows the user to designate the shared data file.

Figure 24:
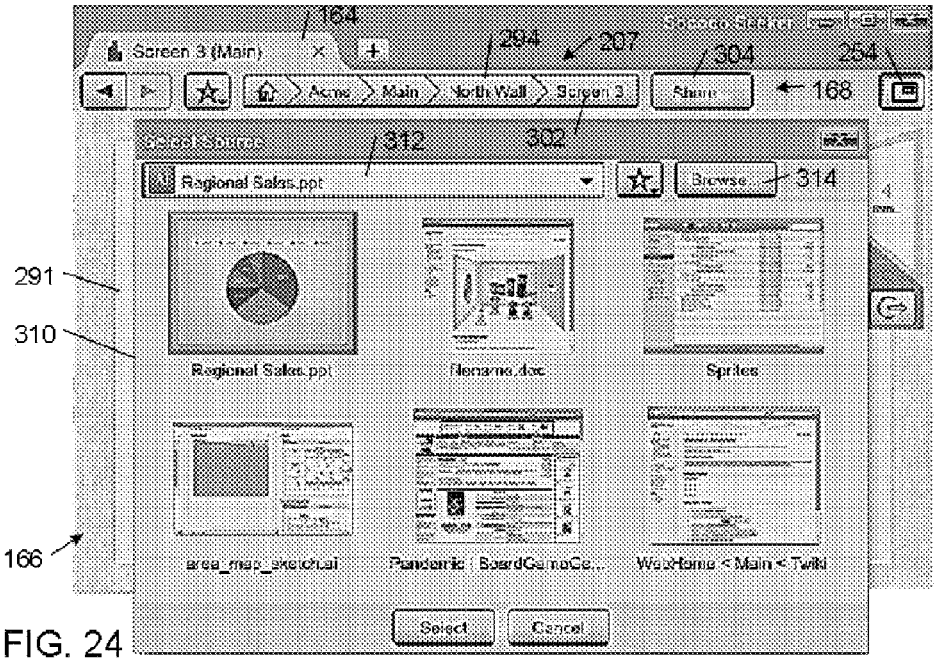
FIG. 24 is a diagrammatic view of an embodiment of a graphical user interface.

Referring to FIG. 24, in response to a user selection of the Share button 304 or the Share link 306, the seeker interface opens a separate Select Source interface window 310 that allows the user to designate a data file whose contents will be shared on the view screen object 291 as described above in section IV. The Select Source interface includes a text box 312 for receiving a data file identifier (e.g., a local data file storage path name or a Uniform Resource Identifier (URI)) and a Browse button 314 that enables the user to browse different locations for the data file identifier. The data file identifier may be located on the client node 12 or another network node. The Select Source interface window 310 also includes a favorites button 316 that allows the user to browse a list of previously bookmarked files, applications, or URIs for the data file identifier.

Figure 25:
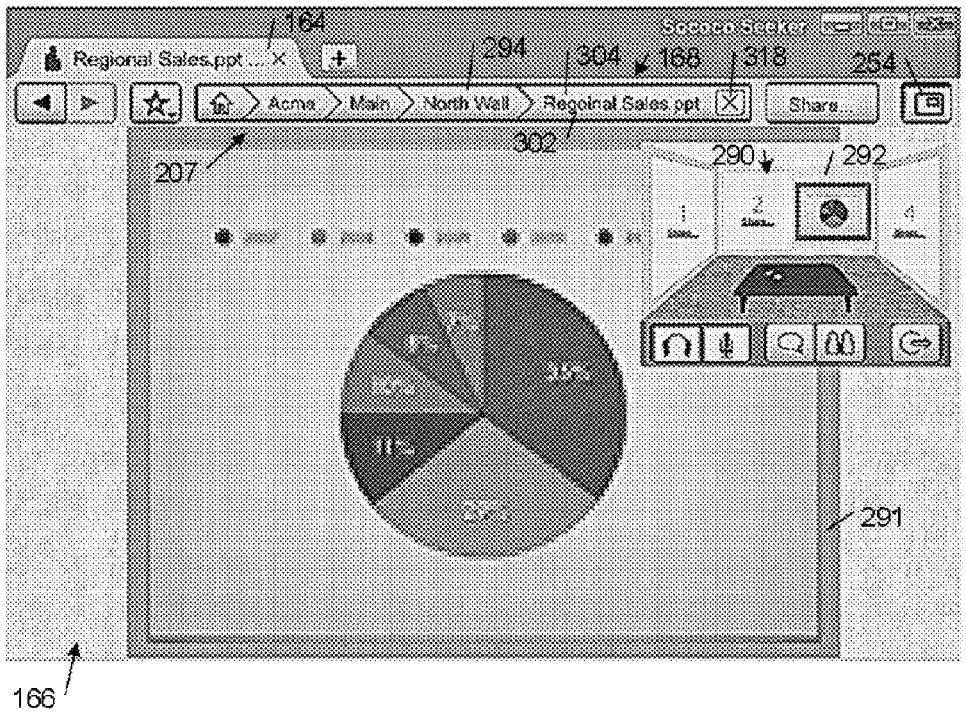
FIG. 25 is a diagrammatic view of an embodiment of a graphical user interface.

Referring to FIG. 25, after the user has selected a data file identifier in the Select Source interface the communications application 26 generates a thumbnail image of the selected data file: In some embodiments, the Scraper module is invoked to capture the thumbnail image of the selected data file. In some embodiments the thumbnail image may be a sample of the main window of the shared application that is associated with the selected data file. The thumbnail image is displayed on the view screen object 291 in both the browsing area 166 and the minimap 256. In the illustrated embodiment, the designated data file corresponds to a PowerPoint® data file that contains a slide of a pie chart. The user can terminate the presentation of the data file on the view screen object 291 by selecting the clear icon 318.

One or more viewers can subscribe to the windows of the shared application showing the contents of the selected data file by clicking (or double-clicking) on the thumbnail image shown on the viewscreen object 291. Each viewer can view, control, edit, and manipulate the shared window content presented on the viewscreen object 291 subject to any governance rules that are associated with the selected data file or the zone containing the viewscreen object 291. If a viewer has control access to the shared window content, the viewer can input commands to the shared process executing on the sharer network node by using one or more input devices on the viewer's network node as described above in section IV. Assuming that realtime performance can be achieved over the respective network connections between the sharer network node and the viewer network nodes, the edits and other manipulations of the shared data file typically will appear to each of the collaborators as if they were made on the same network node.

V. CONCLUSION

The embodiments that are described herein enable application sharing with high fidelity, realtime performance, viewer immersion, and privacy protection. Some embodiments also enable multichannel application sharing in which two or more communicants share applications and screen content with each other at the same time. These embodiments typically include an interface that allows each receiver to distinguish one shared window from another.

Other embodiments are within the scope of the claims.

The invention claimed is:

1. A method, comprising, by a sharer network node:

on a local display of the sharer network node, displaying a representation of a virtual area, a representation of a first viewscreen object in the virtual area, a representation of a second viewscreen object in the virtual area, a representation of a user who is present in the virtual area and operating the sharer network node, and a respective representation of each of one or more other communicants who are present in the virtual area and respectively operating one or more other network nodes;

in a screen layout of windows on the local display, selecting multiple windows that are associated with a first software process based on user input in connection with the first viewscreen object, wherein at least one of the selected windows is at least partially obscured by one or more unselected ones of the windows in the screen layout;

generating a first sequence of composite images of the selected windows as they are arranged in the screen layout at different respective times but free of obscuration in any area obscured by any of the unselected ones of the windows in the screen layout;

transmitting the first sequence of composite images from the sharer network node to a particular one of the one or more other network nodes in connection with the first viewscreen object; and contemporaneously with the transmitting, communicating a second sequence of composite images of windows associated with a second software process between the sharer network node and the particular one of the one or more other network nodes in connection with the second viewscreen object.

2. The method of claim 1, wherein the selecting comprises selecting all of the windows in the screen layout that are associated with the first software process.

3. The method of claim 1, wherein the selecting comprises selecting ones of the windows in the screen layout that match a handle that is assigned to the first software process.

4. The method of claim 3, wherein the selecting comprises selecting a parent window and at least one associated child window that are created by the first software process.

5. The method of claim 1, wherein the generating comprises for each of the composite images in the first sequence:

determining a layering order of the selected windows in relation to each other that corresponds to the relative layering order of the selected windows in the screen layout;

for each of the selected windows, retrieving a respective image of the window; and compositing the retrieved images into the composite image in accordance with the determined layering order.

6. The method of claim 5, wherein the determining comprises:

generating a z-order list that associates a respective z-order value with a respective window handle for each of the windows in the screen layout; and deriving the layering order of the selected windows from the z-order list.

7. The method of claim 6, wherein the deriving comprises:

for each of the z-order values in the z-order list, matching the associated window handle with the window handle of a respective one of the selected windows; and ordering the selected windows in the layering order in accordance with the respective z-order values in the z-order list associated with the ones of the z-order values determined to match the window handles of the selected windows.

8. The method of claim 5, wherein the generating further comprises determining two-dimensional locations of the selected windows in the screen layout for each of the composite images in the first sequence.

9. The method of claim 1, wherein:

the selecting comprises selecting ones of the windows that are associated with a designated group of software processes; and the generating comprises, for each of the composite images in the first sequence:

determining a layering order of the selected windows in relation to each other that corresponds to the relative layering order of the selected windows in the screen layout;

for each of the selected windows, retrieving a respective image of the window; and compositing the retrieved images into the composite image in accordance with the determined layering order.

10. The method of claim 1, wherein a respective image of each of the selected windows is stored in a respective memory buffer, and the generating comprises retrieving each of the images from the respective memory buffers and compositing the retrieved images into the composite image for each of the composite images in the first sequence.

11. The method of claim 1, further comprising by the sharer network node setting the windows that are associated with the first software process to a layered windows style such that a respective image of each of the selected windows is stored in a respective memory buffer.

12. The method of claim 1, wherein the transmitting is performed based on a request from the viewer network node to view screen data associated with the first viewscreen object.

13. The method of claim 12, further comprising transmitting the first sequence of composite images from the sharer network node to multiple of the other network nodes based on a respective request from each of the multiple other network nodes to view screen data associated with the first viewscreen object, wherein the first sequence of composite images is transmitted to the multiple other network nodes contemporaneously.

14. The method of claim 1, wherein the virtual area comprises a plurality of zones, each zone of the plurality of zones supporting establishment of communicant presence in the zone; and further comprising:

on the local display, displaying a visualization of the virtual area, wherein the visualization comprises a spatial layout of the zones;

on the local display, presenting navigation controls and interaction controls, wherein the navigation controls enable the user to specify where to establish a presence in the virtual area and the interaction controls enable the user to manage interactions with the one or more other communicants in the virtual area;

establishing a respective presence of the user in one or more of the zones of the virtual area in response to input received via the navigation controls; and on the local display, depicting the representations of the user and the one or more other communicants in the zones in which the user and the one or more other communicants are present.

15. The method of claim 1, further comprising presenting the first sequence of composite images on the local display in connection with the first viewscreen object.

16. The method of claim 1, further comprising by the sharer network node:

receiving locally-generated commands that are derived from local input device events on the sharer network node;

receiving remotely-generated commands that are derived from remote input device events on a remote viewer network node;

processing the received locally-generated commands and the received remotely-generated commands into a command sequence;

passing the command sequence to the first software process;

presenting the windows in the screen layout on the local display in accordance with the received command sequence.

17. The method of claim 16, wherein the processing comprises remapping screen location parameter values in the remotely-generated commands from a coordinate system of a shared application image received from the sharer network node to a coordinate system of a main window on the local display.

18. The method of claim 17, wherein the processing comprises arranging into the command sequence (i) the remotely-generated commands with the remapped screen location parameter values and (ii) the locally-generated commands.

19. The method of claim 18, wherein the arranging comprises ordering (i) the remotely-generated commands with the remapped screen location parameter values and (ii) the locally-generated commands based on respective times that the locally-generated commands are derived from the local input device events and respective times that the remotely-generated commands are received.

20. The method of claim 17, further comprising remapping screen location parameter values in the commands derived from the remote input device events from a coordinate system of a main window on a remote display of the viewer network node to a coordinate system of the shared application image.

21. The method of claim 20, wherein the remapping is performed on the viewer network node, and further comprising transmitting the remotely-generated commands with the remapped screen location parameter values to the sharer network node.

22. The method of claim 16, wherein the command sequence controls operation of the shared process.

23. The method of claim 1, wherein:

in the screen layout, at least one of the selected windows is obscured by a particular unselected one of the windows in the screen layout; and the generating comprises retrieving a respective image of each of the selected windows from a respective memory buffer for each of respective ones of the composite images in the first sequence, and, from the retrieved images, generating the composite image of the selected windows as they are arranged in the screen layout but free of obscuration in any area obscured by the particular unselected window in the screen layout.

24. The method of claim 1, wherein the transmitting is based on a subscription of the particular one of the other network nodes to content associated with the first viewscreen object.

25. The method of claim 24, wherein multiple of the communicant operating respective ones of the other network nodes are contemporaneously subscribed to content associated with the first viewscreen object; and the transmitting comprises contemporaneously transmitting the sequence of composite images to the network nodes being operated by the communicants who are subscribed to the content associated with the first viewscreen object.

26. The method of claim 24, wherein the virtual area is associated with a governance rule that controls access to the sequence of composite images.

27. The method of claim 26, wherein the governance rule defines one or more conditions on abilities of communicants in the virtual area to subscribe to the transmitted sequence of composite images.

28. The method of claim 26, wherein the governance rule defines one or more conditions on one or more types of access to the transmitted sequence of composite images.

29. The method of claim 28, wherein the governance rule defines a condition on abilities of communicants in the virtual area to view the transmitted sequence of composite images.

30. The method of claim 28, wherein the governance rule defines a condition on abilities of communicants in the virtual area to control the transmitted sequence of composite images.

31. The method of claim 1, further comprising selecting one or more windows that are associated with a second software process, and generating the first sequence of composite image from the selected windows of the first and second software processes as they are arranged in the screen layout at different respective times but free of obscuration in any area obscured by any unselected ones of the windows in the screen layout.

32. The method of claim 1, wherein the communicating comprises by the sharer network node receiving the second sequence of composite images from the particular one of the one or more other network nodes.

33. The method of claim 1, wherein the communicating comprises by the sharer network node transmitting the second sequence of composite images to the particular one of the one or more other network nodes.

34. A method, comprising:

in a screen layout of windows on a local display of a sharer network node, selecting ones of the windows that are associated with a software process, wherein at least one of the selected windows is at least partially obscured by one or more unselected ones of the windows in the screen layout;

on the sharer network node, generating a composite image of the selected windows as they are arranged in the screen layout but free of obscuration in any area obscured by any of the unselected ones of the windows in the screen layout, wherein the generating comprises generating the composite image of the selected windows that includes any contents of the selected windows that are located outside a visible desktop window that contains the screen layout; and transmitting the composite image from the sharer network node to a viewer network node.

35. A method, comprising:

on a local display of a sharer network node, displaying a visualization of a virtual area comprising a plurality of zones, wherein the visualization comprises a spatial layout of the plurality of zones, each zone of the plurality of zones supports establishment of communication sessions between network nodes associated with the zone, a sharer at the sharer network node and a viewer at the viewer network node both have presence in a particular one of the zones of the plurality that comprises viewscreen objects, and the displaying comprises displaying respective representations of the viewer, the sharer, and the viewscreen objects in the virtual area;

on the local display, presenting navigation controls and interaction controls, wherein the navigation controls enable the sharer to specify where to establish a presence in the virtual area and the interaction controls enable the sharer to manage interactions with the viewer in the virtual area;

in response to input received via the navigation controls, establishing a presence of the sharer in the particular zone of the virtual area;

in a screen layout of windows on the local display, selecting ones of the windows that are associated with a software process, wherein at least one of the selected windows is at least partially obscured by one or more unselected ones of the windows in the screen layout;

on the sharer network node, generating a composite image of the selected windows as they are arranged in the screen layout but free of obscuration in any area obscured by any of the unselected ones of the windows in the screen layout;

transmitting the composite image from the sharer network node to a viewer network node;

performing the selecting, the generating, and the transmitting with respect to one or more other software processes executing on one or more other network nodes; and on the local display, presenting the respective composite images transmitted from the one or more other network nodes in connection with different respective ones of the viewscreen objects in the particular zone of the virtual area at the same time.

36. The method of claim 35, further comprising for each of the viewscreen objects in connection with which a respective one of the composite images is presented, on the local display showing the graphical depiction of the respective sharer who is operating the network node from which the respective composite image is transmitted.

37. A method, comprising:

in a screen layout of windows on a local display of a sharer network node, selecting ones of the windows that are associated with a software process, wherein at least one of the selected windows is at least partially obscured by one or more unselected ones of the windows in the screen layout;

on the sharer network node, generating a composite image of the selected windows as they are arranged in the screen layout but free of obscuration in any area obscured by any of the unselected ones of the windows in the screen layout;

transmitting the composite image from the sharer network node to a viewer network node;

sending a request to share screen data associated with [the] *a* software process executing on the viewer network node; and at the sharer network node, receiving a composite image of shared screen data from the viewer network node, wherein the receiving and the transmitting are performed contemporaneously.

[38. At least one non-transitory, tangible computer-readable medium having computer-readable program code embodied therein, the computer-readable program code adapted to be executed by a computer to perform operations comprising:

on a local display of the sharer network node, displaying a representation of a virtual area, a representation of a first viewscreen object in the virtual area, a representation of a second viewscreen object in the virtual area, a representation of a user who is present in the virtual area and operating the sharer network node, and a respective representation of each of one or more other communicants who are present in the virtual area and respectively operating one or more other network nodes;

in a screen layout of windows on the local display, selecting multiple windows that are associated with a first software process based on user input in connection with the first viewscreen object, wherein at least one of the selected windows is at least partially obscured by one or more unselected ones of the windows in the screen layout;

generating a first sequence of composite images of the selected windows as they are arranged in the screen layout at different respective times but free of obscuration in any area obscured by any of the unselected ones of the windows in the screen layout;

transmitting the first sequence of composite images from the sharer network node to a particular one of the one or more other network nodes in connection with the first viewscreen object; and contemporaneously with the transmitting, communicating a second sequence of composite images of windows associated with a second software process between the sharer network node and the particular one of the one or more other network nodes in connection with the second viewscreen object.]

[39. An apparatus, comprising:

a memory storing computer-readable instructions; and a data processing unit coupled to the memory, operable to execute the instructions, and based at least in part on the execution of the instructions operable to perform operations comprising on a local display of the sharer network node, displaying a representation of a virtual area, a representation of a first viewscreen object in the virtual area, a representation of a second viewscreen object in the virtual area, a representation of a user who is present in the virtual area and operating the sharer network node, and a respective representation of each of one or more other communicants who are present in the virtual area and respectively operating one or more other network nodes;

in a screen layout of windows on the local display selecting multiple windows that are associated with a first software process based on user input in connection with the first viewscreen object, wherein at least one of the selected windows is at least partially obscured by one or more unselected ones of the windows in the screen layout;

generating a first sequence of composite images of the selected windows as they are arranged in the screen layout at different respective times but free of obscuration in any area obscured by any of the unselected ones of the windows in the screen layout;

transmitting the first sequence of composite images from the sharer network node to a particular one of the one or more other network nodes in connection with the first viewscreen object; and contemporaneously with the transmitting, communicating a second sequence of composite images of windows associated with a second software process between the sharer network node and the particular one of the one or more other network nodes in connection with the second viewscreen object.]

40. A method, comprising:

on a local display of a sharer network node, displaying a representation of a virtual area, a representation of a first viewscreen object in the virtual area, and a representation of a second viewscreen object in the virtual area;

in a screen layout of windows on the local display of the sharer network node, selecting ones of the windows that are associated with a software process, wherein at least one of the selected windows is at least partially obscured by one or more unselected ones of the windows in the screen layout;

based on user input, associating the software process with the first viewscreen object;

on the sharer network node, generating a first sequence of successive composite images of the selected windows as they are arranged in the screen layout at different respective times but free of obscuration by any other windows in the screen layout;

transmitting the first sequence of composite images from the sharer network node to a first viewer network node based on a subscription of the first viewer network node to content associated with the first viewscreen object;

selecting a second set of one or more of the windows in the screen layout;

generating a second sequence of successive composite images of the selected windows in the second set as they are arranged in the screen layout at different respective times but free of obscuration in any area obscured by any of the windows in the screen layout outside the second set; and based on a subscription of a second viewer network node to content associated with the second viewscreen object, transmitting the second sequence of composite images from the sharer network node to the second viewer network node, wherein the first sequence of composite images and the second sequence of composite images are respectively transmitted to the first and second viewer network nodes contemporaneously.

41. A method, comprising:

on a local display of a sharer network node, displaying a representation of a virtual area, a representation of a first viewscreen object in the virtual area, and a representation of a second viewscreen object in the virtual area;

in a screen layout of windows on the local display of the sharer network node, selecting ones of the windows that are associated with a first software process, wherein at least one of the selected windows is at least partially obscured by one or more unselected ones of the windows in the screen layout;

based on user input, associating the first software process with the first viewscreen object;

on the sharer network node, generating a first sequence of successive composite images of the selected windows as they are arranged in the screen layout at different respective times but free of obscuration by any other windows in the screen layout;

transmitting the first sequence of composite images from the sharer network node to a first viewer network node based on a subscription of the first viewer network node to content associated with the first viewscreen object;

based on user input, associating a second software process with the second viewscreen object;

selecting a second set of one or more of the windows that associated with the second software process;

generating a second sequence of successive composite images of the selected windows in the second set as they are arranged in the screen layout at different respective times but free of obscuration in any area obscured by any of the windows in the screen layout outside the second set; and based on a subscription of a second viewer network node to content associated with the second viewscreen object, transmitting the second sequence of composite images from the sharer network node to the second viewer network node, wherein the first sequence of composite images and the second sequence of composite images are respectively transmitted to the first and second viewer network nodes contemporaneously.

42. A method, comprising:

on a local display of a first network node, displaying a representation of a virtual area, a representation of a first viewscreen object in the virtual area, and a representation of a second viewscreen object in the virtual area, wherein a first communicant is operating the first network node and a second communicant is operating a second network node, the first and second communicants are present in a particular zone of the virtual area comprising the first viewscreen object and the second viewscreen object, and the displaying comprises displaying in the virtual area a representation of the first communicant and a representation of the second communicant;

in a screen layout of windows on the local display of the first network node, selecting ones of the windows that are associated with a software process, wherein at least one of the selected windows is at least partially obscured by one or more unselected ones of the windows in the screen layout;

based on input from the first communicant, the first network node associating the software process with the first viewscreen object;

the first network node generating a first sequence of successive composite images of the selected windows as they are arranged in the screen layout at different respective times but free of obscuration by any other windows in the screen layout;

transmitting the first sequence of composite images from the first network node to the second network node based on a subscription of the second network node to content associated with the first viewscreen object;

based on input from the first communicant, the first network node subscribing to content associated with the second viewscreen object;

the first network node receiving from the second network node a second sequence of composite images of one or more windows associated with a software process executing on the second network node, wherein the transmitting of the first sequence of composite images from the first network node to the second network node is contemporaneous with the receiving of the second sequence of composite images by the first network node from the second network node; and presenting the received second sequence of composite images on the local display in association with the second viewscreen object.

* * * * *